United States Patent
Nakamura et al.

(10) Patent No.: US 8,698,899 B2
(45) Date of Patent: Apr. 15, 2014

(54) MOTION CAPTURE SYSTEM AND METHOD FOR THREE-DIMENSIONAL RECONFIGURING OF CHARACTERISTIC POINT IN MOTION CAPTURE SYSTEM

(75) Inventors: Yoshihiko Nakamura, Tokyo (JP); Katsu Yamane, Tokyo (JP); Hiroaki Tanie, Tokyo (JP)

(73) Assignee: The University of Tokyo, Tokyo (JP)

( * ) Notice: Subject to any disclaimer, the term of this patent is extended or adjusted under 35 U.S.C. 154(b) by 1097 days.

(21) Appl. No.: 11/911,512

(22) PCT Filed: Apr. 11, 2006

(86) PCT No.: PCT/JP2006/307677
§ 371 (c)(1),
(2), (4) Date: Jan. 6, 2009

(87) PCT Pub. No.: WO2006/112308
PCT Pub. Date: Oct. 26, 2006

(65) Prior Publication Data
US 2009/0295711 A1    Dec. 3, 2009

(30) Foreign Application Priority Data
Apr. 15, 2005 (JP) ................................. 2005-117822

(51) Int. Cl.
    *H04N 5/225*    (2006.01)
(52) U.S. Cl.
    USPC ...................... 348/169; 375/240.26
(58) Field of Classification Search
    USPC ............... 348/143–169, 42–60; 375/240.26
    See application file for complete search history.

(56) References Cited

U.S. PATENT DOCUMENTS

| | | | | |
|---|---|---|---|---|
| 5,886,702 A * | 3/1999 | Migdal et al. | ................. | 345/423 |
| 6,192,156 B1 * | 2/2001 | Moorby | ........................ | 382/236 |
| 6,919,892 B1 * | 7/2005 | Cheiky et al. | ................. | 345/473 |
| 7,127,081 B1 * | 10/2006 | Erdem | .......................... | 382/103 |
| 7,508,977 B2 * | 3/2009 | Lyons et al. | ................... | 382/154 |
| 8,194,093 B2 * | 6/2012 | Perlman et al. | ............... | 345/589 |
| 2004/0155962 A1 | 8/2004 | Marks | | |

FOREIGN PATENT DOCUMENTS

| | | |
|---|---|---|
| JP | 04-086958 | 3/1992 |
| JP | 2001-349706 | 12/2001 |

OTHER PUBLICATIONS

Guskov I,, et al.; "Trackable Surfaces" SIGGRAPH'03; ACM SIGGRAPH Symposium on Computer Animation, San Diego, pp. 251-257 (Jul. 26, 2003).

(Continued)

*Primary Examiner* — Andy Rao
*Assistant Examiner* — Jared Walker
(74) *Attorney, Agent, or Firm* — Ladas & Parry, LLP

(57) ABSTRACT

In an optical motion capture system, it is possible to measure spatially high-dense data by increasing the number of measuring points. In the motion capture system using a mesh marker, intersections of lines for the mesh marker are called nodes and the lines connecting the nodes are called edges. The system includes a plurality of cameras for capturing a two-dimensional image of the mesh marker by imaging a subject having the mesh marker, a node/edge detecting section for detecting node/edge information on the mesh marker from the two-dimensional image captured by the respective cameras, and a three-dimensional reconstructing section for acquiring three-dimensional position information of the nodes by using the node/edge information detected from the plurality of two-dimensional images captured by different cameras.

25 Claims, 18 Drawing Sheets

(56) References Cited

OTHER PUBLICATIONS

Ionescu, D. et al.; "3-D Object Model Recovery From 2-D Images Using Structured Light" IEEE Transactions on Instrumentation and Measurement, IEEE Service Center, Piscataway, NJ, US, vol. 53, No. 2, pp. 437-443 (Apr. 1, 2004).

Pritchard, D et al.; "Cloth motion capture" Computer Graphics Forum, Amsterdam, NL, vol. 22, No. 3, pp. 263-2711 (Sep. 2003).

Tanie, H. et al., "High Marker Density Motion Capture by Retroreflective Mesh Suit," IEEE International Conference on Robotics and Automation, pp. 2895-2900 (2005).

Guskov, I., et al., "Efficient Tracking of Regular patterns on Non-rigid Geometry," (pp. 1-4).

* cited by examiner

Raw Image → Sharpened Image → Binarized Image → Thinned Image → Extracted Image

Fig. 11
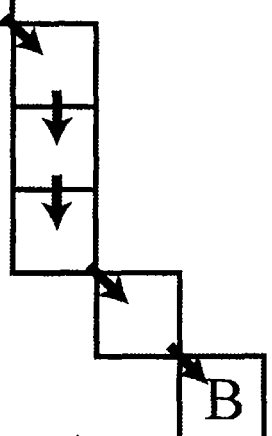
Fig. 12A
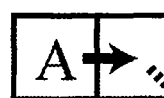
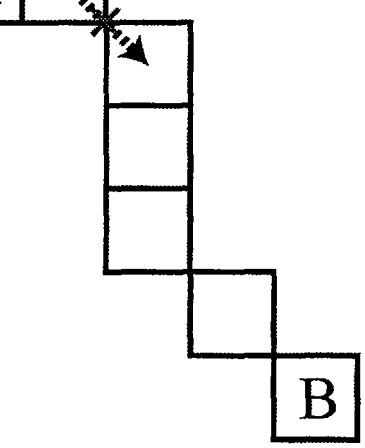
Fig. 12B

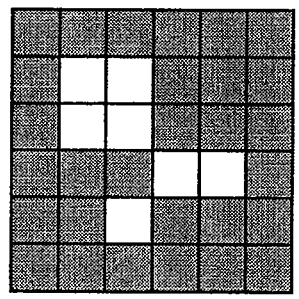 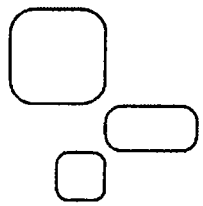 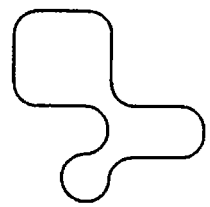
Fig. 13A     Fig. 13B     Fig. 13C
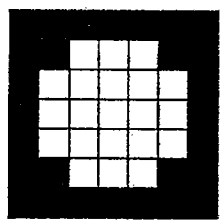 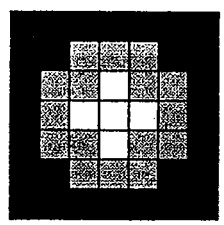 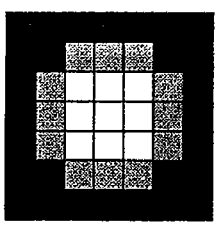 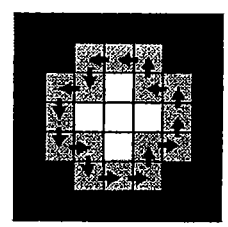
Fig. 14A     Fig. 14B     Fig. 14C     Fig. 14D
Fig. 15
| $x_4$ | $x_3$ | $x_2$ |
|---|---|---|
| $x_5$ | $x_0$ | $x_1$ |
| $x_6$ | $x_7$ | $x_8$ |

Fig. 16
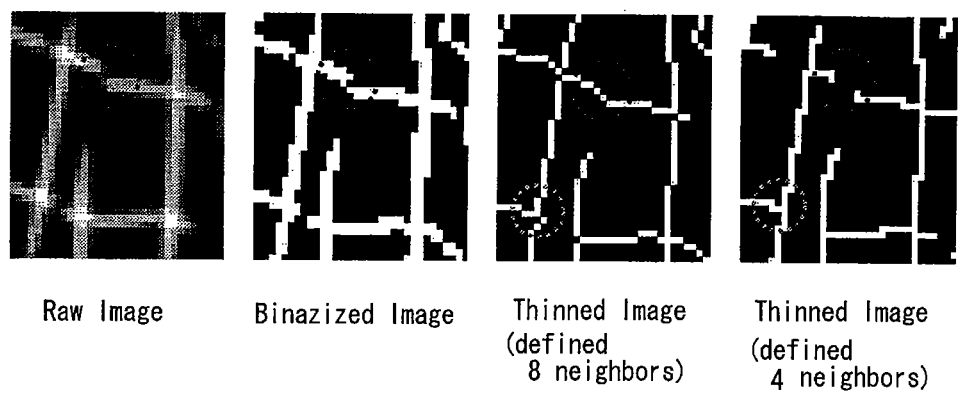
Raw Image   Binazized Image   Thinned Image   Thinned Image
                              (defined        (defined
                              8 neighbors)    4 neighbors)
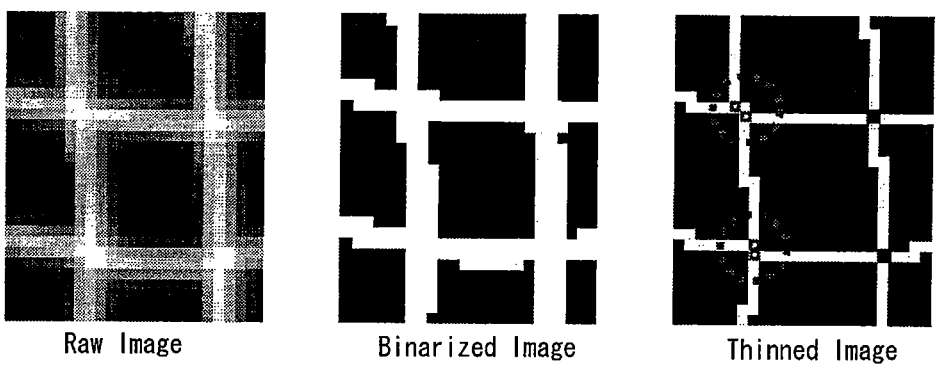
Raw Image           Binarized Image      Thinned Image
Fig. 17A            Fig. 17B             Fig. 17C

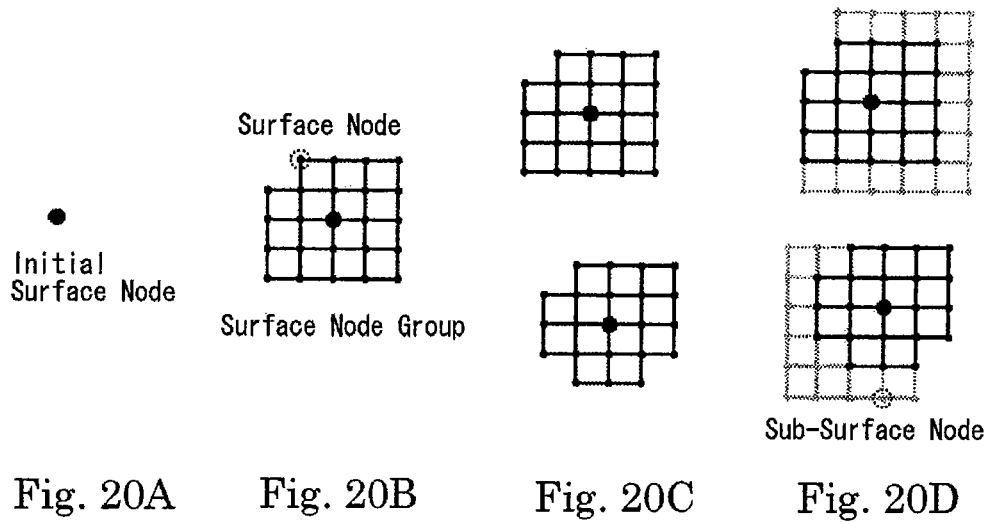
Fig. 20A  Fig. 20B  Fig. 20C  Fig. 20D
Fig. 21
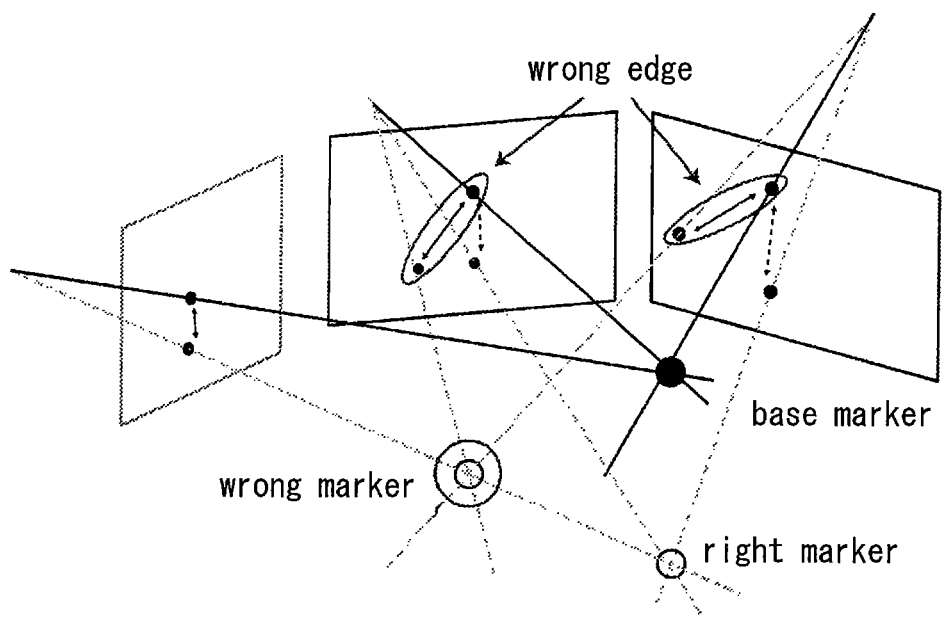

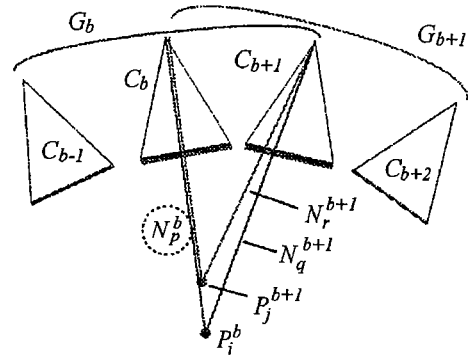
Fig. 22A
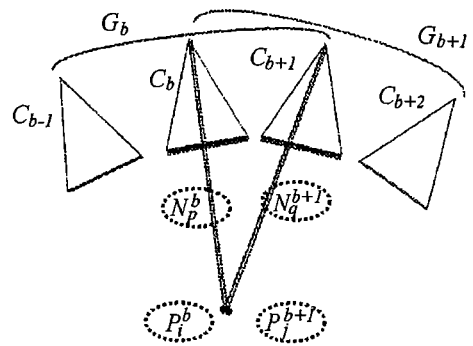
Fig. 22B
Fig. 23A
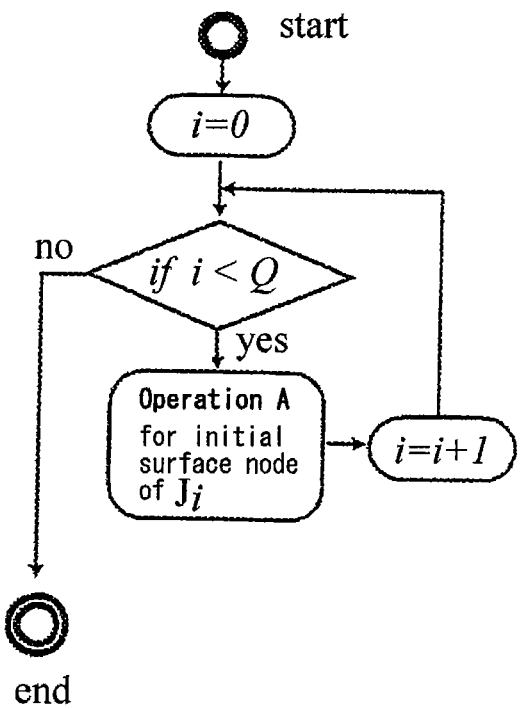

MOTION CAPTURE SYSTEM AND METHOD FOR THREE-DIMENSIONAL RECONFIGURING OF CHARACTERISTIC POINT IN MOTION CAPTURE SYSTEM

TECHNICAL FIELD

The present invention relates to an optical motion capture system.

BACKGROUND ART

Motion capture technology is utilized in various fields such as industry and medical field as well as in the entertainment field. For example, in the field of computer animation, it is possible to achieve more natural-looking movement by applying movement of humans acquired through motion capture to a computer graphics character. In the field of manufacture and development of computer graphics images relating to multimedia and entertainment such as movies and games, motion capture may be indispensable technology. In addition, motion capture technology is also actively employed in various fields such as robotics, biomechanics, sports science, and medical field. Motion capture technology may be optical, magnetic, or mechanical etc. Optical motion capture depends on the type of marker and may be classified into passive optical motion capture and active optical motion capture.

With current motion capture technology, optical motion capture is used where a number of cameras are arranged around a subject and the subject is photographed with the number of cameras. Three-dimensional position information is then calculated by synthesizing two-dimensional information obtained from these images. The optical motion capture is commonly used in applications requiring a high degree of precision taking place at high-speed. This is because accuracy is high compared to other methods, the subject is not particularly inconvenienced, and the subject is not subjected to the influence of magnetism, etc.

In optical motion capture, it is common to attach feature points referred to as "markers" to the subject in order to facilitate image processing. Three-dimensional positions for the markers can then be calculated using triangulation theory by collating marker position information obtained from a number of viewpoints. This processing is referred to as three-dimensional reconstruction, and in order to carry this out it is necessary to know the corresponding relationship of markers detected by the number of cameras. After three-dimensional reconstruction, motion of a link mechanism is obtained by mapping three-dimensional position information for the markers to motion of a link mechanism model for a human. This is carried out using usual inverse kinematics calculations and it is necessary to know which part of the subject each detected marker is fixed to. The process for obtaining this information is referred to as "labeling".

It is therefore the objective of current motion capture methods to model a person's body as mechanisms of rigid links and joints and to measure joint angles. However, detailed data including changes in the shape of a body during motion may be required depending on the application, and the extent of detail of the measured data is one important problem. Making this detailed refers to the measuring of data that is spatially highly dense by increasing the number of measuring points.

Passive optical motion capture employs markers covered with a retroreflective material. The retroreflective material usually has the property of reflecting light in the direction of a light source. It is therefore easy to detect the marker by placing the optical light close to the camera. The marker itself does not generate light and the extent to which the subject is inconvenienced is extremely small. However, three-dimensional reconstruction and labeling are difficult because of the lack of distinction between markers. When the number of markers increases, the amount of processing exponentially increases and the likelihood of erroneous recognition also increases.

On the other hand, with active optical motion capture, the markers themselves are light sources. Three-dimensional reconstruction and labeling can therefore be made straightforward by changing the color and timing of illumination of the markers. However, the extent to which the subject is inconvenienced increases because wires are necessary to supply electrical power to the markers. Further, the number of markers that can be utilized at one time is limited, and measurement of motion of a number of subjects at the same time is difficult.

In this way, with optical motion capture of the related art, it is necessary to increase the number of markers in order to obtain highly detailed data. However, in particular, because of the following reasons, it is difficult to increase the number of markers in optical motion capture methods of the related art.

(1) According to passive optical motion capture of the related art, when markers are arranged in close proximity to each other, the likelihood of errors being made with regards to correlation of the markers between camera images taken from different viewpoints in calculation of three-dimensional positions for the markers increases, and calculation of three-dimensional positions becomes difficult.

(2) According to passive optical motion capture of the related art, the amount of processing increases exponentially when the number of markers is increased.

(3) According to active optical motion capture of the related art, the number of markers is physically restricted.

The following similar technology also exists in addition to motion capture. A stereo vision system automatically extracts feature points from images and performs three-dimensional reconstruction. However, application to calculation of motion is difficult because processing takes substantial time. Further, it is also difficult to obtain the same precision as for motion capture. A three-dimensional scanner for measuring a three-dimensional shape of a physical body by irradiating a subject with a laser pattern etc. and photographing the result with a camera exists as technology for measuring the three-dimensional position of a number of points with a high-degree of precision. However, measurement of a physical body in motion is difficult because irradiation of the whole of the subject with a laser takes a certain period of time. Further, these methods are based on a completely different theory to that of current optical motion capture and their introduction therefore requires replacement of both hardware and software.

It is therefore an object of the present invention to measure data with a high degree of spatial density by increasing the number of measurement points in a motion capture system.

It is therefore a further object of the present invention to suppress the amount of calculation involved when measuring data with a high degree of spatial density by increasing the number of measurement points in a motion capture system.

DISCLOSURE OF THE INVENTION

A motion capture system adopted by the preset invention therefore employs a mesh marker wherein intersections of lines constituting the mesh marker are then taken as nodes and lines connecting each node are taken as edges. The nodes then provide position information for feature points and the edges provide connectivity information indicating connection of the feature points. The motion capture system of the present invention is comprised of a plurality of cameras for photographing a subject the mesh marker is provided at and acquiring two-dimensional images for the mesh marker, a node/edge detecting section for detecting node/edge information for the mesh marker from the two-dimensional images taken by each camera, and a three-dimensional reconstructing section for obtaining three-dimensional position information for the nodes using node/edge information detected from the plurality of two-dimensional images taken by different cameras.

A three-dimensional reconstruction method for optical motion capture system adopted by the preset invention therefore employs a mesh marker wherein intersections of lines constituting the mesh marker are then taken as nodes and lines connecting each node are taken as edges. The nodes then provide position information for feature points and the edges provide connectivity information indicating connection of the feature points. The method comprises an image acquiring step of acquiring two-dimensional images for the mesh marker by photographing a subject provided with the mesh marker, a node/edge detecting step of detecting node/edge information for the mesh marker from the two-dimensional images taken by each of the cameras, and a three-dimensional reconstruction step of obtaining three-dimensional position information for the nodes using the node/edge information detected from the plurality of two-dimensional images taken by different cameras. The present invention also comprises a computer program for executing the feature point three-dimensional reconstruction method for optical motion capture and a recording medium recorded with the computer program.

It is a characteristic of the present invention that a mesh-shaped marker is affixed to at least part of the surface of a subject in place of spherical markers (feature points) used in normal optical motion capture systems. This marker is referred to as a mesh marker and an example is shown in FIG. 1. Preferably, a mesh marker is comprised of a pattern of sufficiently high contrast where the lines of the mesh marker can be detected using image processing. For example, it is possible to provide a mesh marker using the same retroreflective material as the spherical markers of passive optical motion capture so that detection is most straightforward when a light is placed close to the camera, but this is by no means limiting. The present invention is by no means limited to passive optical motion capture systems and application in active optical motion capture systems is also possible by manufacturing a mesh marker from, for example, luminous material. The mesh marker may be affixed to clothing or special tights etc. or may be affixed directly to the surface of the body. It is sufficient for the clothing to cover at least part of the subject, and the clothing may include any apparel, headwear, or footwear. Direct application may be preferable in the case of measurement of the movement of expressions of a face. The pattern may be a cross-sectional shape (where each node is the apex of a square and each edge is the edge of a square) as shown in FIG. 1, may be polygonal such as a triangle (where each node is the apex of a polygonal, and each edge is the edge of a polygonal), or may be another shape.

In this specification, intersections of tapes on a mesh marker are taken to be nodes, lines connecting the nodes are referred to as "edges", and "nodes" are regarded as feature points that correspond to spherical markers of the related art. Edges provide connectivity information for between nodes, and may be straight lines or curved lines. Nodes in two-dimensional images are referred to as "image nodes", and nodes in three-dimensional space are referred to as "surface nodes".

The final output of the system is position information for surface nodes. Here, a node measured using one camera is represented as one straight line (node vector) from a camera position in three-dimensional space, and surface node position information is acquired by calculating an intersection of node vectors. Two straight lines (node vectors) do not usually completely intersect. Therefore, in one aspect, the length of a line segment where the distance between two straight lines is a minimum and a predetermined threshold value are compared. When the length of the line segment is smaller than the threshold value, it is determined that the two lines intersect, and a midpoint of two points on the line segment is taken to be a point of intersection. Three-dimensional information for the edges includes position information and direction. These can be calculated if the three-dimensional positions of nodes at both ends of an edge are known. If the three-dimensional reconstruction of the nodes can then be achieved, three-dimensional reconstruction of the edges is possible automatically. Three-dimensional information for the edges can be used, for example, at the time of reconstruction of a polygon.

According to the present invention, in the three-dimensional reconstruction of the feature points (generation of surface nodes), it is possible to reduce the number of image nodes (candidates) during searching of a plurality of image nodes whose node vectors intersect each other by utilizing connectivity information for three-dimensionally reconstructed image nodes.

In one preferred aspect, with three-dimensional reconstruction of the feature points (generation of surface nodes), first, initial surface nodes that are more accurate three-dimensional position information for nodes are generated by imposing severe conditions. After generating the initial surface nodes, a surface node group is expanded from the initial surface nodes by utilizing connectivity information between nodes provided by the edges.

In one aspect, a three-dimensional reconstructing section has an intersection determining section for determining intersections of a plurality of node vectors of a plurality of cameras. The intersection determining section has a first strict condition and a second less strict condition. The three-dimensional reconstructing section further comprises an initial surface node generating section taking points of intersection selected by the first intersection determining condition as initial surface nodes, and a surface node group generating section taking points of intersection selected by second intersection determining condition from node vectors corresponding to image nodes connected to the image nodes of the initial surface nodes by edges as surface nodes. The surface node group generating section further takes points of intersection selected using the second intersection determining condition from node vectors corresponding to image nodes connected to image nodes of generated surface nodes by edges as surface nodes.

It is also possible to use connectivity information provided by edges even for initial surface node generation. In one aspect, the intersection determining conditions for the initial surface node generation include intersection determination as to whether or not one set or a plurality of sets of node vectors corresponding to image nodes that are connected to the image nodes of the initial surface nodes by edges intersect one another. Further, in one aspect, intersection determining conditions include a threshold value for determining distance between node vectors wherein a smaller threshold value is set to distance between node vectors for generating initial surface nodes, and a larger threshold value is set to distance between node vectors for generating surface nodes other than the initial surface nodes. Moreover, the intersection determining conditions may also include the number of lines of intersection. For example, a condition that three node vectors intersect one another at a threshold is more strict condition than a condition that two node vectors intersect each other at a threshold.

Normally, a plurality of cameras are arranged so as to encompass a subject. In a preferred embodiment, the cameras are comprised of a plurality of camera groups. Three-dimensional position information for nodes is then acquired every camera group. In this case, each camera group may be comprised of a series of a plurality of neighboring cameras. Neighboring camera groups then preferably have at least one common camera. In one example, each camera group consists of three cameras, and each camera group shares two cameras of the three cameras.

In a preferred embodiment, processing for calculating three-dimensional positions for the nodes is comprised of an image node/edge detecting section, a surface node generating section (local three-dimensional reconstructing section), and a data integration section. The three-dimensional reconstructing section is comprised of the surface node generating section and the data integration section. Processing carried out at each part is shown in the following.

(a) Image Node/Edge Detecting Section

First, image nodes/edges are detected from images taken by each camera using the following procedure.

(1) Grayscale images taken by the cameras are subjected to sharpening processing using a Laplacian operator and the sharpened images are put into binary form.

(2) Thinning processing is carried out on the binary image.

(3) Image nodes coinciding with points of intersection of lines from a thinned image and edges connecting these image nodes are extracted.

The details of an algorithm will be described later. However, the configuration for the image node/edge detecting section and the node/edge detection steps adopted by the present invention are by no means limited to that shown here, and other image processing means may also be used providing that such means are capable of detecting the nodes and edges.

(b) Surface Node Generating Section (Local Three-Dimensional Reconstructing Section)

Next, a plurality of neighboring cameras (three cameras are shown in the example) are taken as a single camera group. Processing for calculating three-dimensional positions for surface nodes from image node/edge information detected from images of cameras belonging to each group is local three-dimensional reconstruction. When there are N cameras altogether, the number of such group is N, and three-dimensional reconstruction is carried out for all of these groups. Regarding each image node, let us consider a vector with a focal point of a camera as a starting point on which it is assumed that a corresponding surface node exists. This is referred to as a node vector. If node vectors from a plurality of cameras intersect, it is possible to assume that a surface node exists at a point of intersection, but in reality, it is unlikely that the node vectors strictly intersect due to calibration errors for the camera and errors at the time of extracting image nodes. Taking this into consideration, three-dimensional reconstruction is carried out using the following procedure.

(1) A combination of node vectors intersecting at a distance less than the threshold value provided by the user is searched for from node vectors of a plurality of cameras (three cameras shown in the example). Requirements become more severe for a larger number of intersecting node vectors (for example, three more so than two), and for a smaller threshold value. If a combination of intersecting node vectors is found, then examine whether or not a set or a plurality of sets of node vectors corresponding to surface nodes connected to the surface nodes by edges intersect one another using a threshold. If a set or sets of the node vectors intersect one another, it is then determined that the above-mentioned combination of node vectors is a correct combination, and the point of intersection is taken be a surface node. This node is referred to as the "initial surface node".

(2) Based on the image node combinations that have already been found, it is determined whether or not node vectors corresponding to image nodes connected to the image nodes by edges intersect one another. Here, the threshold value for the intersection determination is set to be a value larger than the threshold value used in the initial surface node generation. By utilizing the connectivity information, the number of candidates to be searched for node vectors for one image is reduced to four at most. The above process is then repeated for edges that are not yet looked at.

(3) If image nodes that have not yet been used in reconstruction remain, (1) is returned to. Completion takes place in cases other than this. Alternatively, surface nodes may be generated under less restrictive conditions (sub-surface node generation). For example, in (1) and (2) above, a surface node is generated at a point of intersection of three node vectors, but in the generation of a sub-surface node, a surface node is generated at the point of intersection of three node vectors. The details of an algorithm will be described later.

(C) Data Integration Section

Two camera groups having two neighboring cameras exist and a combination of node vectors is obtained independently for each group at the local three-dimensional reconstructing section. Therefore, there are cases where the combinations match and cases where the combinations conflict. This is data integrating processing where, in the case of matching, the combinations are integrated, and in the case of conflicting, then it is determined that one of either is erroneous. In one aspect, the determination as to whether the surface nodes conflict is determined by whether or not the following two conditions are satisfied: a distance between two surface nodes is less than a predetermined threshold value; and different image nodes in the same camera image are not utilized. When these conditions are satisfied, the surface nodes are integrated. Further, in one aspect, integration of the surface nodes includes combining of image nodes occurring between matched surface nodes, with the position of the surface node then being updated using the combined image nodes. When two surface nodes conflict, a surface node with a larger number of node vectors being used is made to remain, and a surface node with a smaller number of node vectors is eliminated. Further, when the number of node vectors is the same between the surface nodes, a surface node for which the average distance between node vectors is a minimum is selected. The details of an algorithm will be described later.

A configuration for computers for carrying out the above processing may be freely chosen but considering that the image node/edge detection processing from the camera images and the three-dimensional reconstruction processing for the camera groups can be executed independently, it is preferable in point of processing time to execute these processes in parallel using separate CPU's, with the computers being connected via a network if necessary. An example of implementation of this system is shown in FIG. 8. Further, the flow of processing for this example is shown in the following.

(1) The data integration section sends detection instructions to the image node/edge detecting section. The image node/edge detecting section then detects image nodes and edges by utilizing the newest image at this point. The detection results are then sent to the corresponding local three-dimensional reconstructing section and the data integration section.

(2) The local three-dimensional reconstructing section then receives image node/edge detection results for three of the respectively neighboring cameras. When all of the detection results for the corresponding cameras are received, three-dimensional reconstruction calculations are carried out. Connectivity information between calculated three-dimensional positions for surface nodes and edges and nodes resulting from edges is sent to the data combining section.

(3) If all of the local three-dimensional reconstruction results are received, the data integration section carries out data combining processing. Three-dimensional reconstruction results for the final surface node and edge are then obtained by the data integration section. The details will be described later.

The optical motion capture system of the present invention suppresses increases in the amount of calculation (calculation time) resulting from an increase in the number of nodes by utilizing connectivity information for a mesh marker in three-dimensional reconstruction of feature points (nodes) and acquires data of a high spatial density.

The motion capture system of the present invention is capable of implementing three-dimensional reconstruction in real time with few errors even when a large number of markers exist in close proximity by using a mesh marker having information for connecting between feature points in place of usual markers.

Further, the motion capture system of the present invention does not employ special hardware. This means that a conventional optical motion capture system can be utilized as is simply by replacing the software and markers.

Moreover, by separating the three-dimensional reconstruction into local three-dimensional reconstruction processing (for example, processing using groups of three cameras) and surface node integrating processing, it is possible to perform faster calculations and improve data reliability.

BRIEF DESCRIPTION OF THE DRAWINGS

FIG. 11 shows a filtering matrix for edge sharpening;
FIG. 12A and FIG. 12B show difference of the path line between 8-neighbour and 4-neighbours.
FIG. 13A, FIG. 13B and FIG. 13C shows difference of connected components between 4-neighbours and 8-neighbours;
FIG. 13A shows a raw image,
FIG. 13B shows connected components in 4-neighbours definition,
and FIG. 13C shows connected component in 8-neighbours definition;
FIGS. 14A-14D show boundary point and border following;
FIG. 14A shows a raw image;
FIG. 14B shows boundary point in 4-neighbours definition;
FIG. 14C shows boundary point in 8-neighbour definition;
and FIG. 14D shows border following in 4-neighbours definition;
FIG. 15 shows a definition of neighbor grids used in calculating connectivity numbers;
FIG. 16 shows difference of thinned image according to difference in connectivity definition; from the left, a raw image, a binary image, a thinned image (defined 8 neighbors, a thinned image (defined 4 neighbors);
FIG. 17 shows intersections in thinned image are expressed as two branches;
FIG. 17A shows a raw image, FIG. 17B shows a binary image, FIG. 17C shows a thinned image where small squares on the right side in the thinned image are pixels of the intersection (connectivity number: 4) and the portions surrounded by small squares on the left side are intersections which have been separated into two branch points (connectivity number: 3);
FIGS. 20A-20D show an overview of local reconstruction of feature points;
FIG. 21 shows an example of reconstructing wrong surface node based from right surface node;
FIG. 22A shows an example of conflicted surface node;
FIG. 22B shows an example of accordant surface node;
FIG. 23A shows a flow chart of integration process.

DETAIL DESCRIPTION OF THE INVENTION

[1] Motion Capture System Utilizing the Connectivity Information of Marker

[1-1] Connectivity Information of Marker

Figure 1:
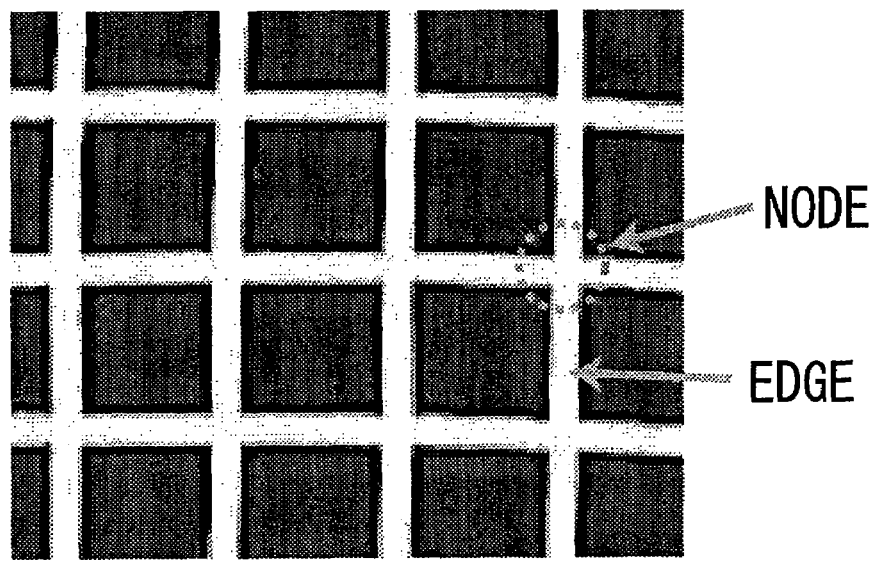
FIG. 1 is a partial view of mesh marker.

In the present system, in place of regularly-used spherical markers, marker with the retroreflective tape arranged in mesh forms (hereinafter called the mesh marker) is used. FIG. 1 shows a partial diagrammatic view of a mesh marker. The intersections of the tapes are called nodes and a line connecting two nodes is called an edge. Unlike regularly-used spherical markers, in the mesh marker, respective nodes have connectivity information. The connectivity information relates to the information on which nodes are connected each other by edges. By utilizing the connectivity information of the mesh marker has, the three-dimensional position of nodes can be accurately estimated. The difference of three-dimensional reconstruction methods where the connectivity information is used and where the connectivity information is not used will be discussed as follows.

[1-2] Three-Dimensional Reconstruction Using the Connectivity Information

Figure 2:
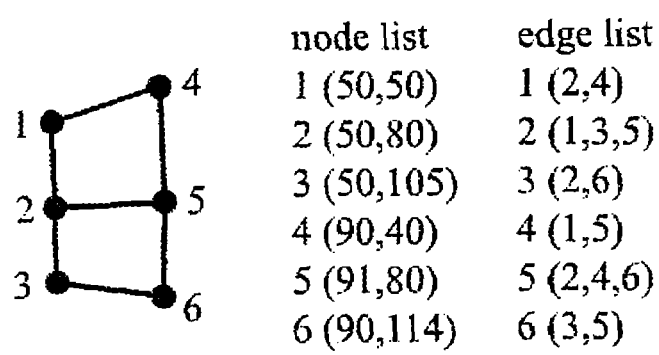
FIG. 2 shows node information and edge information extracted from 2D image.

The three-dimensional reconstruction in the present system means reproduction of three-dimensional locations of nodes and the edges that connect the nodes based on a plurality of two-dimensional images of the mesh marker photographed from different viewpoints. From the images of mesh marker photographed, mesh information in the two-dimensional images as shown in FIG. 2 is obtained. The mesh information consists of the information (node list) on node locations on the two dimensional image and a list (edge list) which describes the connectivity information. For example, node list 1 (50, 50) indicates that the location of No. 1 node is coordinates (50, 50), and edge list 1 (2, 4) indicates that the No. 1 node is connected to No. 2 node and No. 4 node.

In the present specification, terms related to the node and the edge are defined as follows:

Image nodes: Nodes on a two-dimensional image, which constitute two-dimensional position information of the nodes.

Image edges: Edges that connect nodes on a two-dimensional image

Surface nodes: Nodes reconstructed on the three dimensions, which constitute three-dimensional position information of the nodes.

Surface edges: Edges that connect nodes on the three dimensions.

Mesh nodes: Nodes of the actual mesh marker

Mesh edges: Edges of the actual mesh marker

Node vector: Vector extending through image nodes with the camera position as a starting point and it is assumed that the surface node exists on this vector.

Figure 3:
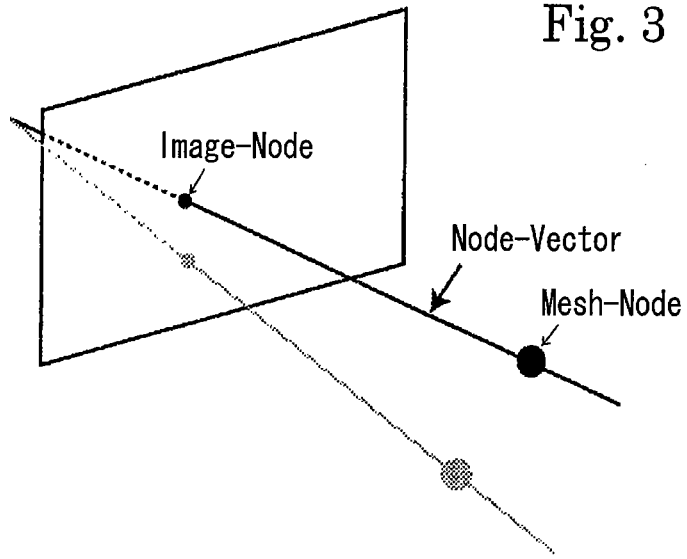
FIG. 3 is a view explaining a node vector.

In an optical motion capture, the three-dimensional reconstruction is, in general, carried out by the following method. Meanwhile, in the following description, for the sake of convenience, in spherical markers also, marker images in the two-dimensional images are called image nodes, markers reconstructed on the three dimensions are called surface nodes, and actual marker are called mesh nodes. The image node in a camera image is expressed as one straight line drawn from the camera position. The mesh node that corresponds to the image node is assumed to exist somewhere on this straight line in the three-dimensional space. This straight line is called a node vector (FIG. 3). The three-dimensional position of the surface node is found as the intersection of node vectors of a plurality of cameras. In the three-dimensional position computation, image nodes which indicate the same mesh nodes must be associated with each other from camera images of different visual points, and this can be carried out by searching for image nodes whose node vectors intersect. When many mesh nodes exist at a short distance, the possibility of making a mistake in matching image nodes increases. In addition, let M denote the number of markers and N the number of cameras; then, the number of markers explosively increases as the number of markers increases because the computation amount for searching increases by the order of $M^N$.

Figure 4:
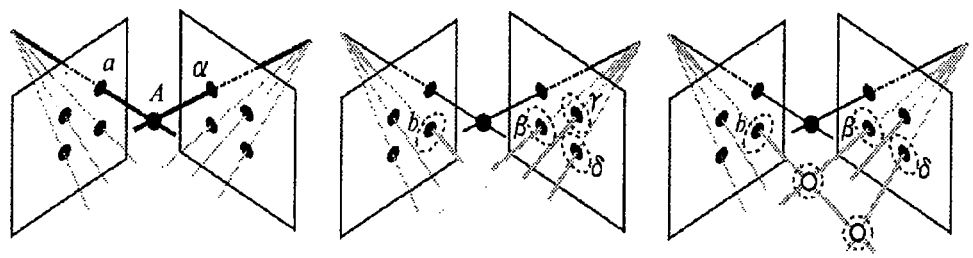
FIG. 4 is a view showing a case where 3D reconstruction of feature points is conducted without using edge information.
Figure 5:
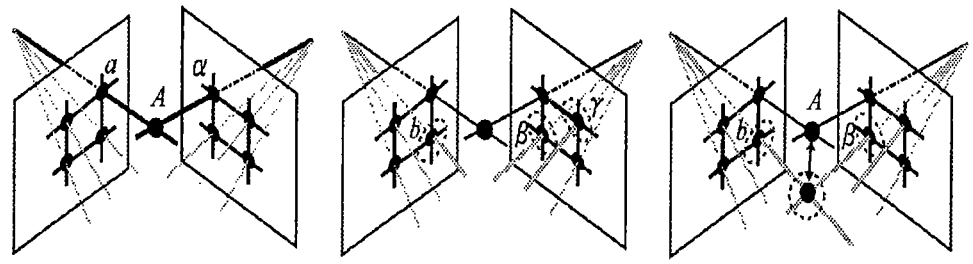
FIG. 5 is a view showing a case where 3D reconstruction of feature points is conducted using edge information.

In the present invention, by utilizing the connectivity information of mesh marker, it is possible to reduce the possibility of selecting a set of wrong node vectors, and to suppress an increase in computation amount associated with an increase of the number of markers. FIG. 4 and FIG. 5 show the difference of three-dimensional reconstruction when marker connectivity information is used and when marker connectivity information is not used. FIG. 4 relates to the three-dimensional reconstruction not using connectivity information and FIG. 5 shows the state of the three-dimensional reconstruction using connectivity information. In the three-dimensional reconstruction in which connectivity information is not used, even when marker A in the drawing is reconstructed, in order to find an image node that corresponds to the image node of b in the left-side camera image, an image node must be searched from all the image nodes in the right-side camera images. Consequently, when a plurality of intersecting node vectors exist, it is difficult to specify the corresponding image node. In the three-dimensional reconstruction that utilizes connectivity information, search for an image node that corresponds to the image node of b in the left-side camera images is limited to $\beta$ and $\gamma$ in the right-side camera images because of the connectivity information with the marker A. Consequently, there is little possibility that a plurality of intersecting node vectors exist and there is little increase in computation amount caused by an increase of the number of markers.

[1-3] Overview of the System

Figure 6:
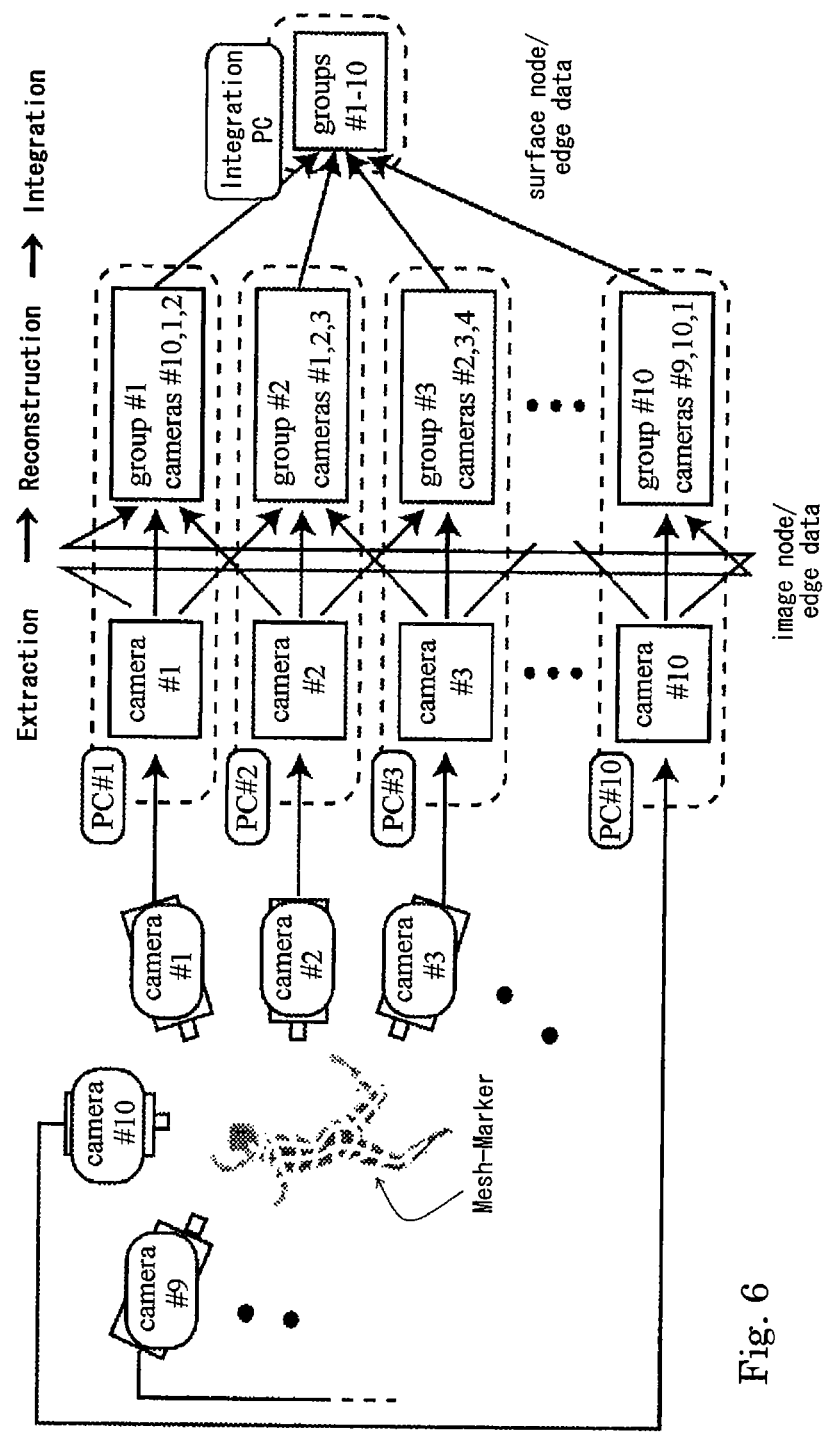
FIG. 6 is a schematic overall view of a motion capturer system of the present invention.

FIG. 6 shows the overview of the present system. The present system comprises three steps: image node extraction (Extraction), surface node production (Reconstruction), and surface node integration (Integration). In images taken by each camera, images are processed by the PC (camera PC) equipped to each of them and mesh information is extracted. The surface node is generated by each camera PC based on the mesh information obtained from a total of three cameras, one camera and neighboring cameras on both sides. The three-dimensional reconstruction results of surface nodes computed by each camera PC are integrated by a PC for integration to obtain the final reconstruction results. The surface node obtained by integration is particularly called an integrated surface node. The reason why the reconstruction computation is divided into groups containing three cameras each is to increase the computation speed and increase the data reliability. This will be later discussed. In the present system, a total of 10 cameras are used and surface nodes are generated in ten groups, respectively. The integrated surface node achieves high reliability because it is obtained by eliminating conflicting portions from independently computed surface nodes of each camera group and integrating matched portions.

[1-4] System Configuration

[1-4-1] Hardware Configuration

Figure 7:
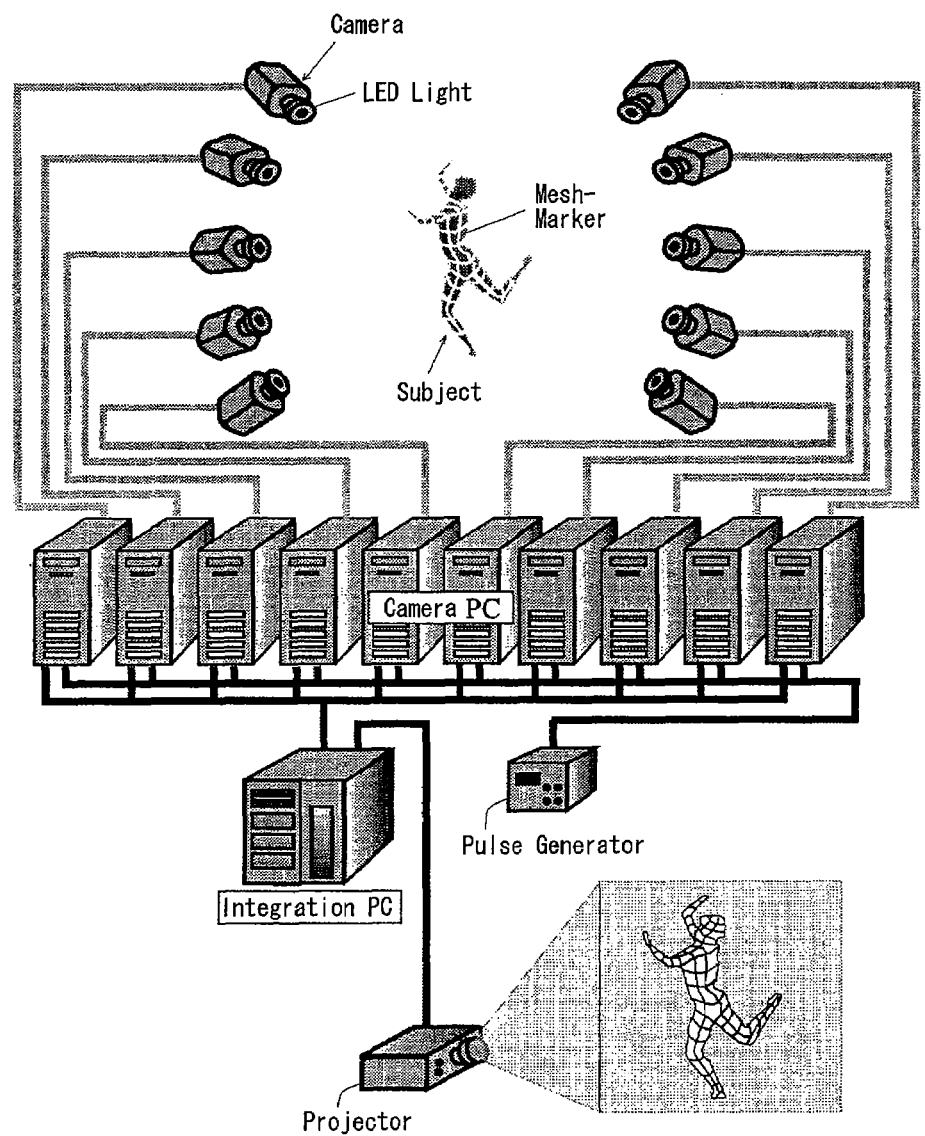
FIG. 7 is a view showing a hardware configuration of a motion capture system of the present invention.

FIG. 7 shows the hardware configuration of the present system. Now, features of each element are discussed as follows.

[High-Resolution Camera]

Ten high-resolution cameras Adimec-1000m available from Adimec are used. The camera provides 10-bit grayscale with 1000×1000 pixels, and can capture images at 50 fps in the asynchronous mode and at 40 fps in the synchronous mode by external pulse. In the present system, the cameras are used in the synchronous mode. The cameras are arranged near the ceiling along the outer circumference of a studio, at substantially regular equiangular intervals with respect to the studio center.

[LED Lighting]

To each camera, circular LED lighting is mounted. In the present system, mesh marker with retroreflectivity is a subject to be photographed. The light beams emitted from LED lighting mounted to each camera are intensely reflected in each camera direction by the retroreflective tape of mesh marker and camera images in which only the marker portions are highlighted can be obtained.

[Pulse Generator]

To each camera, a trigger is sent from a pulse generator. By this trigger, the photographing timing of the cameras is synchronized.

[PC Cluster]

A total of 10 cameras, one camera for each PC (hereinafter called the camera PC), and one PC (hereinafter called the integration PC) for integrating the whole system are used. Roles of each PC will be later discussed. Meanwhile, for data transmission and reception between PCs, MPI (Message Passing Interface) is used.

[1-4-2] Software Configuration

Figure 8:
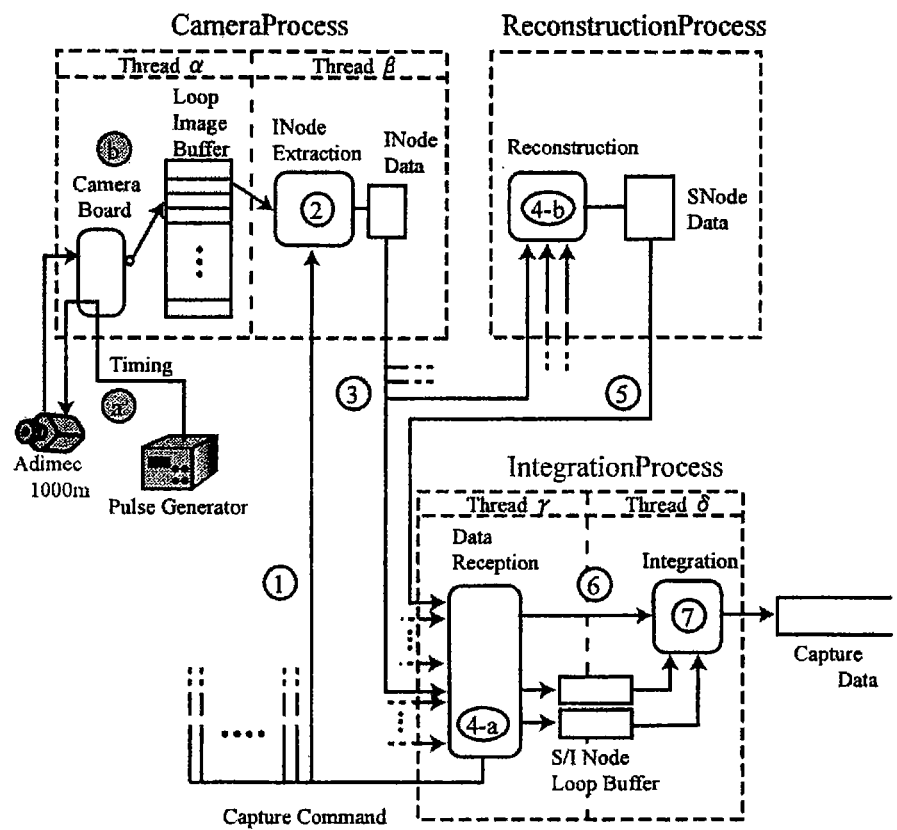
FIG. 8 is a view showing a data flow of a motion capture system of the present invention.

As discussed in 1-3, the system comprises three types of processes: image extraction, surface node extraction, and surface node integration. Of these, the processes of image node extraction and surface node generation can be independently computed by cameras and camera groups, respectively. These two processes are computed in parallel by each camera PC and surface node integration processing is performed by the integration PC. FIG. 8 shows a data flow when measurement is actually performed.

A captured image from cameras is performed by the following processes by Thread α during camera processing:

(a) When the pulse generator transmits photographing timing, an image capture command is conveyed to cameras via an image capture board; and (b) Images are transmitted from cameras to camera PCs and images are written in loop buffer memory in the PC.

The three-dimensional reconstruction computation is performed by the following processes:

(1) An image processing instruction is sent from the integration process to the camera process.

(2) When the image processing instruction is received, the camera process uses the latest images in a loop buffer memory and extracts an image node.

(3) The camera process transmits the image node data to the integration process and the reconstruction processes of its own and neighboring cameras on both sides.

(4-a) The data reception monitoring thread (Thread γ) in the integration process stores data in the loop buffer when it receives the image node data.

When the data is received from the all camera process, the image processing instruction is sent (to Step (1)).

(4-b) The reconstruction process carries out reconstruction computation when it receives image node data of three cameras.

(5) Upon completion of the reconstruction computation, the surface node data is sent to the integration process.

(6) The data reception monitoring thread stores the surface node data in the loop buffer. When the data is received from all the reconstruction process, the integration computation instruction is sent to the integration computation thread (Thread δ)

(7) Integration computation is carried out and time-series data of integration surface node is obtained.

Processes (a) and (b) are processes to photograph images and operate with the external pulses used as a trigger irrespective of steps (1) through (7). Steps (1) through (7) are processes to actually carry out image processing, reconstruction, and overall computation. The integration process sends an image processing instruction to each camera PC to control synchronization timing. The frame rate of motion capture depends on the computation time of the image processing process.

[2] Mesh Information Extraction Algorithm

[2-1] Overview of the Mesh Information Extraction

From photographed grayscale images, the positions of the image nodes and the image edges are extracted. Because this process decides the overall frame rate and exerts effects on the accuracy of the three-dimensional reconstruction, an algorithm that extracts mesh information at high speed and as accurately as possible is required. The extraction of the mesh information conforms to the following processes:

(1) Sharpening: To intensify the image contrast and to clarify differences between the mesh marker portion and the remaining portion;

(2) Binarizing: To binarize the sharpened image;

(3) Thinning: To extract the core wire from the binary image; and (4) Extracting information: To extract positions of image nodes and their connectivity information from thinned images.

Figure 9:
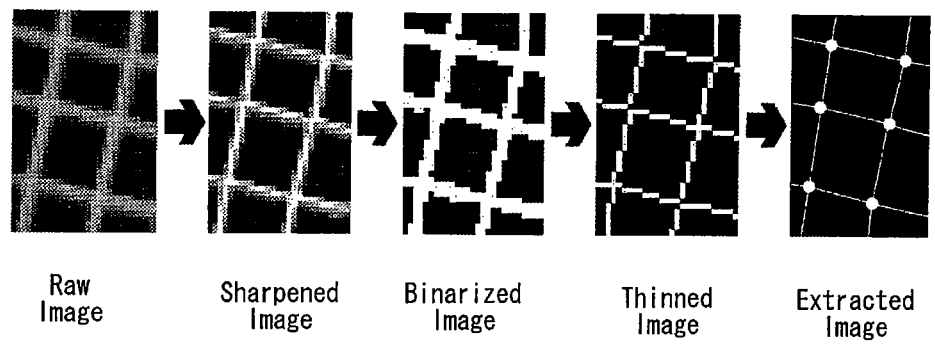
FIG. 9 shows processed images obtained after each step of mesh information extraction algorithm; from the left, raw image, sharpened image, binary image, thinned image and extracted node/edge image.

FIG. 9 shows a flow from the original image to extraction of mesh information. Now each processing is discussed as follows.

[2-2] Sharpening and Binarizing

Because the thinned images to obtain connectivity information of the image nodes are obtained based on binary images, the connectivity may be affected by a binarizing threshold value. In order to reduce the effect, sharpening of edges is conducted before binarizing to highlight the differences between the portions where mesh markers are affixed and the remaining portions. For sharpening, a spatial filter method is used. The spatial filter method is the process to subtract the secondary differentiation image f" (Laplacian) from the image f. By subtracting the secondary differentiation image, overshoot and undershoot are generated in intensity variation; as a result, sharpening of images with the edge gradient highlighted can be achieved.

Figure 10:
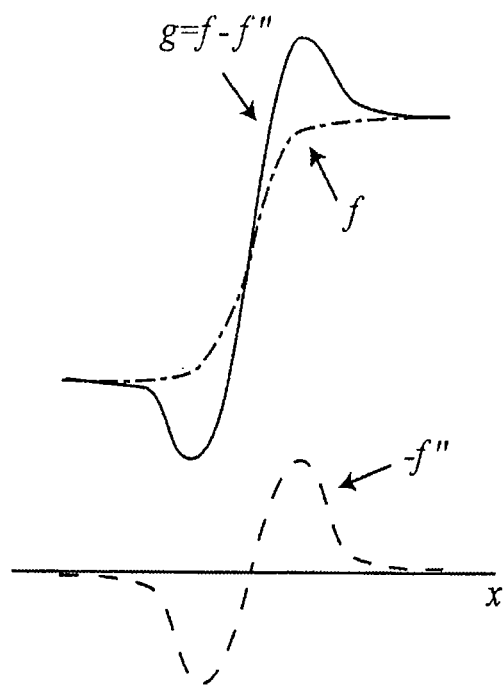
FIG. 10 shows edge sharpening through a Laplacian operator.

FIG. 10 shows the state of intensity variation of the original image and sharpened images f. FIG. 10 shows intensity variation of an image along an axis in the image. The abscissa in the figure indicates the axis in the image and the ordinate indicates the intensity. The dot-dash line indicates the intensity variation of the original image, the chain line indicates the secondary differential image f" with positive and negative inverted, and the solid line indicates the edge-sharpened image g. Let f(i, j) denote the intensity of pixel on the i-row j-line in the image; then, the Laplacian operator is expressed by Eq. (2) by the directional difference $\Delta_i f$, $\Delta_j f$ defined by Eq. (1), and directional secondary difference $\Delta_i^2 f$, and $\Delta_j^2 f$.

$$\left. \begin{array}{l} \Delta_i f(i, j) = f(i, j) - f(i-1, j) \\ \Delta_i^2 f(i, j) = \Delta_i f(i+1, j) - \Delta_i f(i, j) \\ \Delta_j f(i, j) = f(i, j) - f(i, j-1) \\ \Delta_j^2 f(i, j) = \Delta_j f(i, j+1) - \Delta_j f(i, j) \end{array} \right\} \quad (1)$$

$$\begin{aligned} \nabla^2 f(i, j) &= \Delta_i^2 f(i, j) + \Delta_j^2 f(i, j) \\ &= \binom{\Delta_i f(i+1, j) -}{\Delta_i f(i, j)} + \binom{\Delta_j f(i+1, j) -}{\Delta_j f(i, j)} \\ &= \left\{ \binom{f(i+1, j) -}{f(i, j)} - \binom{f(i, j) -}{f(i-1, j)} \right\} + \\ &\quad \left\{ \binom{f(i, j+1) -}{f(i, j)} - \binom{f(i, j) -}{f(i, j-1)} \right\} \\ &= \binom{f(i+1, j) +}{f(i-1, j)} + \binom{f(i, j+1) +}{f(i, j-1)} - 4 f(i, j) \end{aligned} \quad (2)$$

Consequently, the edge-sharpened image g(i, j) is expressed as Eq. (3) and can be achieved by the filter of FIG. 11.

$$g(i,j)=5f(i,j)-(f(i+1,j)+f(i-1,j)+f(i,j+1)+f(i,j-1)) \qquad (3)$$

The sharpened image is binarized to obtain a binary image. Binarizing is performed by the following equation:

$$f_T(i,j) = \begin{cases} 1 & \text{where } f(i,j) \geq T \\ 0 & \text{where } f(i,j) \leq T \end{cases} \qquad (4)$$

$f_T$ is a binary image, and 1 is allocated to the value of the effective region (white region) and 0 to the value of the background region (black region). Hereinafter, "effective pixel" means the pixel of $f_T$ (white pixel). Actually, to increase the efficiency, sharpening, binarizing, and further selection of the effective range are simultaneously carried out. The effective range means a range of image where effective pixels exist, and in this case, is a rectangle.

[2-3] Thinning

In order to extract node position and connectivity information, thinning is provided to binarized images. Thinning is to thin a line width of the figure to a one-pixel-wide line while avoiding the topological connectivity from being changed. The thinned line is called core-line. From the thinned figure, linkage of line segments can be easily found. For thinning, the following conditions must be satisfied:

The line width of the core-line becomes 1.

The core-line position becomes the center of line width.

Connectivity of figures is maintained.

Before thinning, definitions of adjacent pixels and the number of connections are given. The following are discussed with binary images as the object.

[Adjacent Pixels and Connectivity]

The adjacent pixels have two types of definitions of 4-connected neighbors and 8-connected neighbors. Four pixels located above and below as well as right and left with respect to a certain pixel is called 4-connected neighbors. In addition to the 4-connected neighbor pixels, pixels including the diagonal 4 pixels are called 8-connected neighbors. Using the adjacent pixels, connectivity can be defined between pixels. If there exists a path that traces adjacent effective pixels between certain two points, it is said that the two points are connected. The connectivity differs by the definitions of neighboring pixels, and the connection when defined in the 4-connected neighbors is called 4 connections and the connection when defined by the 8-connected neighbors is called 8 connections. FIG. 12A shows the path between two points A-B when 8 connections are made. When defined by four-connected neighbors as is the case of FIG. 12B, there exists no path between A and B and these two points are not connected. A set of connected pixels is called connected component. FIG. 13 shows the interpretation of the connected component in each connection definition wherein FIG. 13A is an original image, FIG. 13B is the connected component by the definition of four-connected neighbors, and FIG. 13C is the connected component by the definition of eight-connected neighbors. By the definition of connection, the connected component is connected or disconnected. Which connection definition should be used shall be appropriately selected in accordance with the cases to be used.

[Connectivity Number]

The effective region of a binary image is composed with a set of boundary points next to the background region and a set of internal points which are not next to the background. FIG. 14 shows the state of the boundary points wherein FIG. 14A is the original image, FIG. 14B is the boundary points when the effective region is defined by four connections, and FIG. 14C shows boundary points in the case of 8-connected neighbors. In FIG. 14, the boundary points are expressed in a gray color.

Tracing the boundary points of the connected component defined in this way is called the boundary tracing (FIG. 14D). By utilizing the boundary tracing, it is possible to define the connectivity number for each pixel. The connectivity number means the frequency of passing the pixel when the boundary tracing is conducted, and the features of the pixel can be classified according to the connectivity number, as shown in Table 1. The connectivity number can be computed by the equation shown by Eq. (5) and Eq. (6).

| Feature of pixel defined by connectivity number | |
|---|---|
| connectivity number | feature |
| 0 | isolated point or interior point |
| 1 | end point |
| 2 | connecting point |
| 3 | branch point |
| 4 | cross point |

$$(4 - \text{connections}) \; N(4) = \sum_{k \in C} (f(x_k) - f(x_k)f(x_{k+1})f(x_{k+2})) \qquad (5)$$

$$(8 - \text{connections}) \; N(8) = \sum_{k \in C} (\bar{f}(x_k) - \bar{f}(x_k)\bar{f}(x_{k+1})\bar{f}(x_{k+2})) \qquad (6)$$

Here, $x_k$ denotes the position shown in FIG. 15 and C=1, 3, 5, 7, $\bar{f}=1-f$, $x_9=x_1$.

Using the connectivity number defined as above, thinning of a figure is conducted. Pixels that correspond to the boundary points are searched for and are deleted when the phase of the figure is not changed even if the pixel is deleted. Thinning is conducted by repeating this operation. Thinning is carried out as follows:

[Thinning Algorithm]

(1) Step 1: If there is any pixel that satisfies the right-side boundary conditions in the image f, proceed to Step 2. Here, the pixel that satisfies the right-side boundary condition means the pixel in the effective region whose right-side pixel is the background region, and in the similar manner, the effective pixels which have the background regions on the lower side, left side, and upper side are called the lower-side boundary, left-side boundary, and upper-side boundary.

(2) Step 2: Compute the connectivity number of the pixels for all the pixels which satisfy the right-side boundary of the image.

(3) Step 3: Of the pixels computed in Step 2, delete the pixels whose connectivity number is 1 or less. Designate the pixels whose connectivity number is 2 or more as permanent preservation points and in the repetition processing thereafter, these pixels shall not be subject to deletion.

Carry out Steps 1, 2, and 3 on the lower-side boundary, left-side boundary, and the upper-side boundary, also. Repeat this operation until there is no pixel which is deleted in a series of flows of deleting the right, lower, left, and upper-side boundary points.

The image after thinning differs in accordance with the definition of the connectivity number. FIG. 16 shows the difference of thinned images caused by difference in the definition of connectivity number. The images in FIG. 16 are, starting from the left, a raw image, binarized image, thinned image by the 8-connectivity definition and thinned image by the 4-connectivity definition. The one-pixel wide diagonal line in the binarized image is connected by the 8-connectivity definition but is split by the 4-connectivity definition. However, the edge expressed by one-pixel width in the binary image is assumed to provide extremely low reliability. To see the raw image on the left of FIG. 16, it can be confirmed that the edge surrounded by a frame is actually not connected. In addition, the intersection positions are easier to extract in the 4-connectivity definition than in the 8-connectivity definition. For the reasons stated above, in the present system, 4-connectivity is used for the definition of the connectivity number.

[2-4] Extraction of Information of Node Position and Connectivity Information

From the thinned image, intersections and connectivity between intersections are extracted. As described above, in accordance with the connectivity number, features of pixels can be classified. The intersection is a pixel with the connectivity number of 4. However, there is actually a case in which the thinned image has the intersection expressed as two branch points as shown in FIG. 17. FIG. 17A is a raw image, 17B is a binarized image, and 17C is a thinned image, and small squares on the right side in the thinned image are pixels of the intersection (connectivity number: 4) and the portions surrounded by small squares on the left side are intersections which have been separated into two branch points (connectivity number: 3). In the image node extraction processing, pixels whose connectivity number is 3 or more (branch points and intersections) are searched for from the image, and when it is the branch point, it is necessary to confirm whether it really is the branch point or it is the branch point formed by separating one intersection as is the case with FIG. 17C.

Image nodes and image edges are extracted by the following processing:

(1) Step 1: The image is scanned to find pixels whose conductivity number is 3 or more.

(2) Step 2: With respect to the pixels of intersections and branch points found when scanning is finished, conduct the following processing, respectively.

[Processing Concerning the Intersection]

Trace the path composed of adjacent effective pixels from the pixel of the intersection until the pixel of another intersection/branch point or the end point is reached. When the intersection/branch point is reached, store the connectivity information with the intersection/branch point.

[Processing Concerning the Branches]

Similarly to the processing on the intersection, trace the path from the pixel of the branch point until the pixel of another intersection/branch point or the end point is reached. When the intersection is reached, store the connectivity information with the intersection. When the branch point is reached, examine the length of the path to the branch point. When it is less than a threshold value, it is determined that the branch point pixel and the branch point reached have resulted from one intersection which has been divided, and designate the midpoint of these two branch points as the correct intersection. When it is more than the threshold, similarly to the cross-point pixel, store the connectivity information with the branch point.

By the foregoing processing, image nodes and image edges are extracted from image to obtain mesh information. Because these processing are conducted by image processing, it is difficult to correctly and completely extract the mesh information. Depending on images, image nodes or image edges may fail to be extracted or on the contrary, nonexistent image nodes or image edges may be extracted. Consequently, in the three-dimensional reconstruction process, it is necessary to devise a process which is robust against errors in the extracted mesh information.

[3] Three-Dimensional Reconstruction Algorithm

[3-1] Three-Dimensional Reconstruction

The three-dimensional reconstruction of the present system conducts the three-dimensional reconstruction from the mesh information of three cameras at each camera PC as shown in FIG. 6, and the integrated surface nodes, the final data, are obtained by eliminating conflicting portions and integrating the matching portions of these reconstruction results at the integration PC. In the following, description will be made on the surface node generation process carried out in each camera group and the integration process of surface nodes carried out in integration PC.

[3-2] Generation of Surface Nodes

Surface nodes are generated from camera images of adjacent cameras. The surface nodes are generated by the following three steps.

Figure 18:
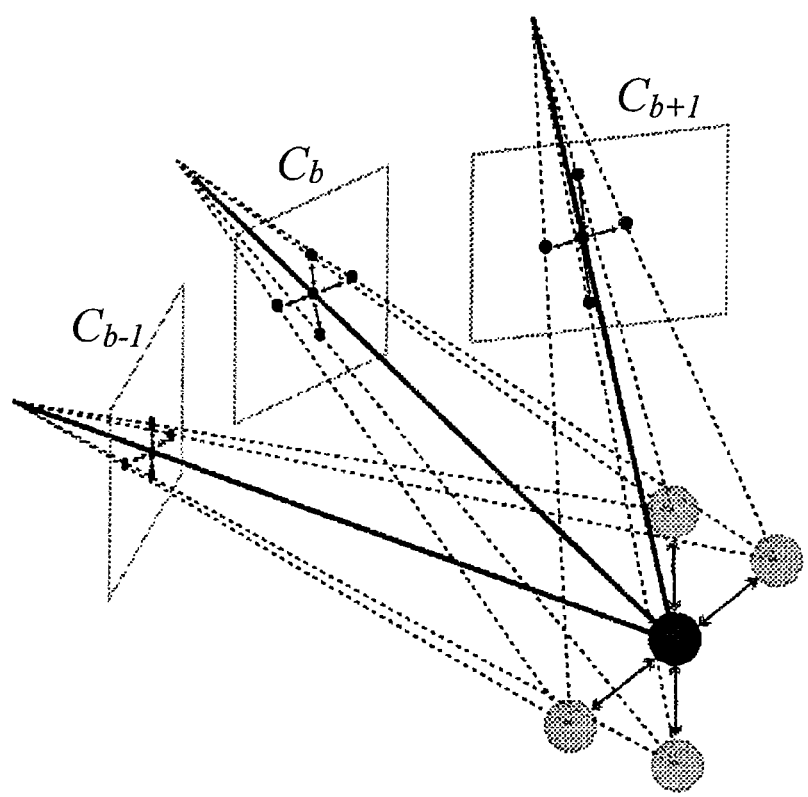
FIG. 18 shows generation of an initial surface node.

[A] Generation of the Initial Surface Node (FIG. 18)

Find a combination of node vectors which intersect at one point from three camera images to generate a surface node at their intersection. The surface node generated here is called the initial surface node.

Figure 19:
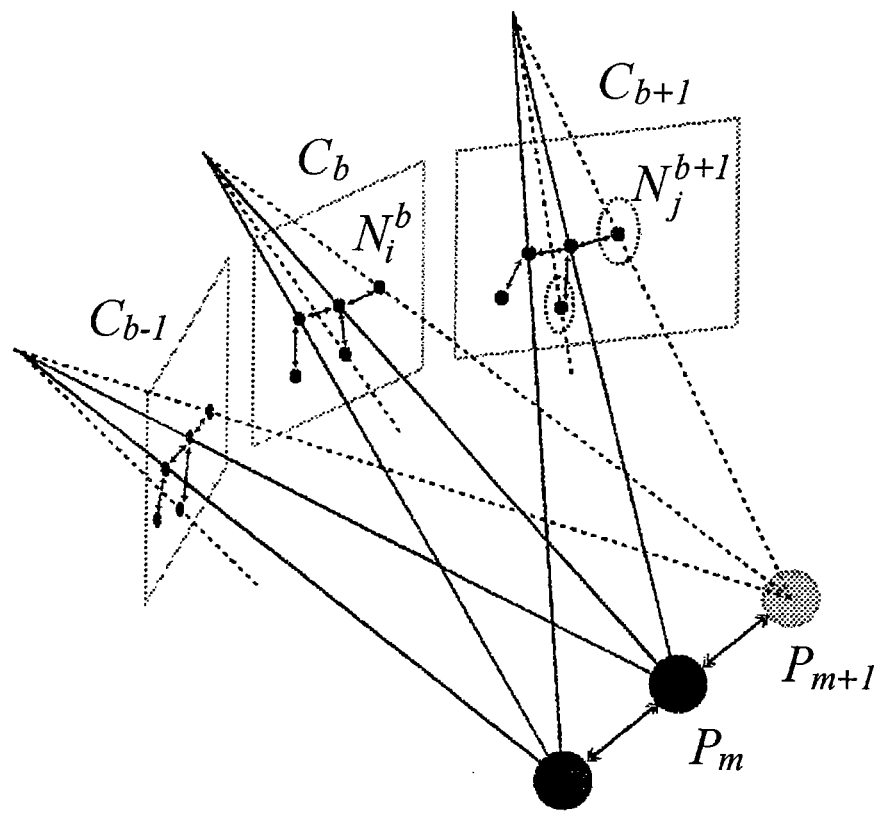
FIG. 19 shows expansion of mesh utilizing data from three cameras.

[B] Generation of the Surface Node Group (FIG. 19)

Successively generate new surface nodes from the initial surface nodes by use of the connectivity information. The surface nodes generated here are connected directly or indirectly to initial surface nodes. A set of these surface nodes is called a surface node group. The initial surface node which serves as the source of generation is called the center of this surface node group.

[C] Expansion of the Surface Node Group by Sub-Surface Nodes

With surface nodes allowed to be reconstructed by two node vectors, the surface node group is further expanded. The surface node consisting of two node vectors, which is reconstructed here, is called a sub-surface node.

The reference symbols are defined as follows and each of the processing will be described in detail.

$N^i_m$: the m-th image node observed by camera C $V^i_m$: the node vector associated with node $N^i_m$ $E^i_m$: set of image nodes directly connected to image node $N^i_m$ $N^i$: set of image nodes in $C_i$ which are not used for construction of surface nodes $P_n$: a surface node constructed using three node vectors $P_n(N^{i-1}_p, N^i_q, N^{i+1}_r)$ means that $P_n$ is constructed by $N^{i-1}_q$, $N^i_q$, and $N^{i+1}_r$.

$^sP_n$: a sub-surface node reconstructed using two node vectors $S_n$: set of surface nodes directly connected to $P_n$ and sub-surface nodes $d_v(V^i_m, V^j_n)$: the distance between $V^i_m$ and $V^j_n$ $d_p(V^i_m, P_n)$: the distance between $V^i_m$ and $P_n$ Once even one surface node is reconstructed, surface nodes can be successively constructed efficiently by tracing the surrounding edges. By using the connectivity information, the number of distance computations of node vectors for search can be reduced, and the possibility of constructing incorrect surface nodes can be reduced. However, since the initially constructed surface node serves as the source of the reconstruction thereafter, this must be of high reliability. The first step is to find a reliable surface node. The initial surface node is generated as follows. Here, processing with camera $C_b$ is mainly described. The same applies to all other cameras and computation is conducted in a relevant camera PC.

[A] Generation of Initial Surface Nodes (1) Step 1: Select an image node $N_p^b$.

(2) Step 2: Among the image nodes observed by camera $C_{b+1}$, find an image node $N_q^{b+1}$ that satisfies the following conditions. Here, $C_{b+1}$ indicates a camera located next to $C_b$.

To satisfy $d_v(V_p^b, V_q^{b+1}) \le d_{hard}$, where $d_{hard}$ is a threshold value for determining as to whether or not node vectors intersect one another.

There are two or more combinations of image nodes $N_i^b \in E_p^b$ and $N_j^{b+1} \in E_q^{b+1}$ which satisfy $d_v(V_i^b, V_j^{b+1}) \le d_{hard}$.

If $N_q^{b+1}$ is found, proceed to Step 3; otherwise, return to Step 1.

(3) Step 3: Execute the same process as Step 2 for camera $C_{b-1}$. If a valid node $N_r^{b-1}$ is found, proceed to Step 4; otherwise, return to Step 1.

(4) Step 4: Construct a surface node $P_0$ from $V_p^b$, $V_q^{b+1}$, and $V_r^{b-1}$.

According to the foregoing procedure, the initial surface node which serves as an origin of reconstruction of a surface group is generated. By using strict threshold value $d_{hard}$ for the intersection of node vectors and setting the intersection of node vectors which are connected to the intersecting node vectors as generation conditions, the possibility of generating incorrect surface node is reduced. When the initial surface node is generated by Process [A], surface nodes are successively generated using the edges around the initial surface node to construct a surface node group. This processing is conducted as follows.

[2] Generation of the Surface Node Group (1) Step 1: Initialize: m=0. Let us consider the initial surface node.

(2) Step 2: Express the surface node of interest as $P_\alpha(N_p^b, N_q^{b+1}, N_r^{b-1})$. For each $N_i^b \in (E_p^b \cap N^b)$, find an image node $N_j^{b+1} \in E_q^{b+1}$ which satisfies the following conditions.

$N_j^{b+1} \in N^{b+1}$.

To satisfy $d(V_i^b, V_j^{b+1}) \le d_{easy}$, where $d_{easy}$ is a less strict threshold value which satisfies $d_{easy} > d_{hard}$.

If the image node $N_j^{b+1}$ which satisfies these conditions is found, proceed to Step 3.

(3) Step 3: Similarly, find $N_k^{b-1} \in E_p^{b-1}$ which satisfies the following conditions.

$N_k^{b-1} \in N^{b-1}$.

To satisfy $d_v(V_k^{b-1}, V_j^b) \le d_{easy}$ and $d_v(V_k^{b-1}, V_j^{b+1}) \le d_{easy}$.

(4) Step 4: If both $N_j^{b+1}$ and $N_k^{b-1}$ are found, newly construct a surface node $P_{m+1}$. Let $P_{m+1}$ be the surface node of interest and furthermore m=m+1, and return to Step 2.

(5) Step 5: Repeat Step 2 to Step 4 until all the edges are examined.

By this procedure, a surface node group with the initial surface node $P_0$ at its center can be generated. Repeat operations of [A] and [B], successively generate surface node groups. When any initial surface node is no longer found, generation of the surface node group is completed.

In the three cameras, a mesh node which can be seen from only two cameras may exist. When all the processing of [A] and [B] are finished, allow the sub-surface node which is constructed by two node vectors by processing of [C] and expand the surface node group further. This is done by the following processing.

[C] Expansion of the Surface Node Group by Sub-Surface Nodes

Step 1: Let us consider the surface node $P_\alpha(N_p^b, N_q^{b+1}, N_r^{b-1})$ located at the boundary end of the surface node group. Being located at the boundary end means that the image node $N_i^b$ which satisfies $N_i^b \in E_p^b$ and $N_i^b \in N^b$ exists.

Step 2: Find the image node $N_j^{b+1}$ or $N_r^{b-1}$ which satisfies the following conditions for the surface node $P_\alpha(N_p^b, N_q^{b+1}, N_r^{b-1})$ of interest (or sub-surface node $\hat{P}_\alpha(N_p^b, N_q^{b+1})$).

$N_j^{b+1} \in N^{b+1}$

To satisfy $d_v(V_i^b, V_j^{b+1}) \le d_{easy}$.

If $N_j^{b+1}$ is found, reconstruct the sub-surface node $\hat{P}_m$ using $V_j^b$ and $V_j^{b+1}$, and carry out processing of Step 2 for this $\hat{P}_m$, also. If not found, return to Step 1 and repeat the processing until all the surface nodes at the boundary end are checked.

The foregoing is the expansion of the surface node group including the sub-surface node. Carry out this processing for all the surface node groups. Because the sub-surface node consists of two node vectors, the sub-surface node provides lower reliability than the surface nodes do. Generation of the sub-surface nodes is performed supplementarily after all the surface nodes are generated by the previous processing of [A] and [B].

FIG. 20 summarizes the flow of generation of surface nodes by a camera group consisting of three cameras. By successively generating surface nodes from the initial surface node of FIG. 20A, one surface node group is obtained (FIG. 20B). By repeating this process, a plurality of surface node groups are generated (FIG. 20C). When any new surface node group can no longer be generated, the sub-surface node is allowed to further expand the surface node groups (FIG. 20D). Because the strict threshold value $d_{hard}$ is used when initial surface node is generated, these can be said highly reliable surface nodes. In the generation process of the surface node group, surface nodes are constructed successively from the initial surface node using the connectivity information. Generation of an incorrect surface node by tracing correct surface nodes occurs only when image nodes or image edges are incorrectly extracted from the camera images of at least two cameras as shown in FIG. 21, where three node vectors including the node vector that corresponds to the incorrect image node happen to intersect at one point. However, the possibility is extremely low. Whether or not the surface node is correct greatly depends on the correctness of the surface node connected to it. It is possible to efficiently reconstruct many surface nodes with high reliability by using the connectivity information in generating the surface node group and by using a less strict threshold value $d_{easy}$ in determining the intersection of node vectors.

[3-3] Integration of Surface Nodes

The surface nodes generated at respective camera group are integrated to provide an integrated surface node with mesh information of all cameras.

Here, additional notations are defined as follows. Hereinafter, a surface node refers to both the surface node and the sub-surface node.

$G_b$: the camera group consisting of three cameras $C_{b-1}$, $C_b$, $C_{b+1}$ $P^b$: set of surface nodes reconstructed at camera group $G_b$ $P_n^b$: a $n^{th}$ surface node in $P^b$ Information on surface node $P_n^b$ sent from the camera group $G_b$ is as follows:

ID: identification number n of $P_n^b$

Coordinate: 3D position of $P_n^b$

Edge: ID of surface node connected to $P_n^b$

Group ID: ID of surface node group belongs to $P_n^b$

Components: image nodes $N_p^b$, $N_q^{b+1}$, $N_r^{b-1}$ of $P_n^b$

Based on the above information, the surface nodes are integrated to obtain the integrated surface nodes.

An image node extracted from each camera is used for reconstruction computation at the maximum of three times because each camera belongs to three camera groups respectively. There is a possibility that an image node used in one camera group may be used for a different surface node of another camera group. This is shown in FIG. 22A. In FIG. 22A, an apex of triangle refers to a camera and a bottom edge refers to a camera projection surface. A straight line extended from the camera indicates a node vector corresponding to an image node Nib of the camera.

The surface node $P_i^b$ in the camera group $G_b$ comprises image nodes $N_p^b$, $N_q^{b+1}$, $N_r^{b-1}$ as elements. On the other hand, the surface node $P_j^{b+1}$ in the camera group $G_{b+1}$ comprises image nodes $N_p^b$, $N_s^{b+1}$, $N_t^{b+2}$ as elements. Though both of $P_i^b$ and $P_j^{b+1}$ use a common image node $N_p^b$, the image nodes of camera $C_{b+1}$ uses an image node other than $N_q^{b+1}$ and $N_s^{b+1}$. In this case, either one of $P_i^b$ and $P_j^{b+1}$ mistakenly uses $N_p^b$. In this situation, conflict of surface nodes $P_i^b$ and $P_j^{b+1}$ is occurred.

On the other hand, when surface nodes of different camera groups that use the same image node are reconstructed from the same image nodes, matching of surface nodes is occurred. Matching of surface nodes is shown in FIG. 22B. Both of $P_i^b$ and $P_j^{b+1}$ use image nodes $N_p^b$ and $N_q^{b+1}$ and there is no conflicting image node.

Figure 23B:
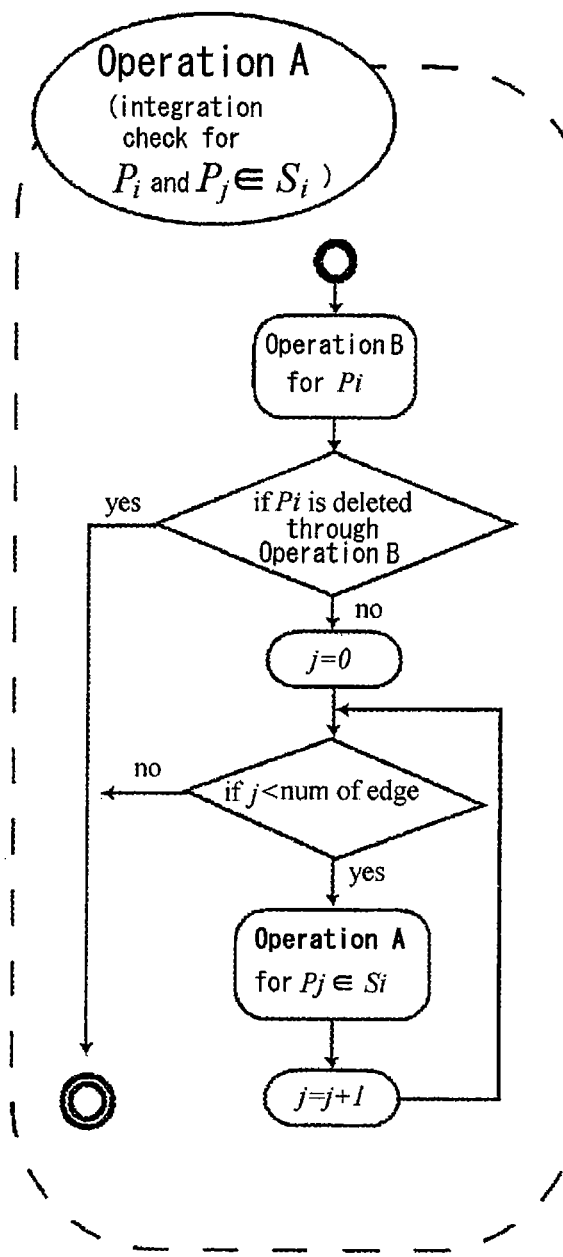
FIG. 23B shows a flow chart of operation A in FIG. 23A.
Figure 23C:
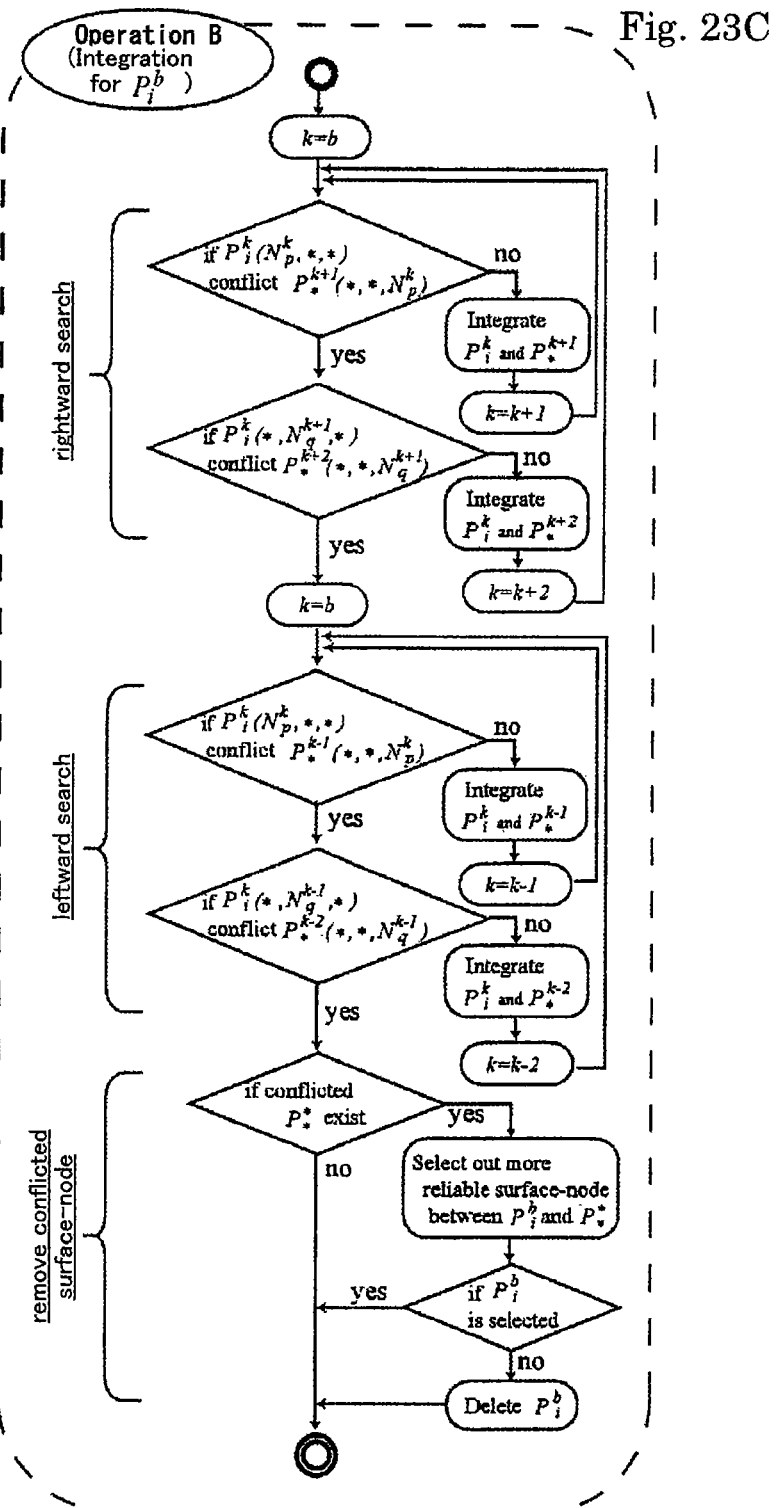
FIG. 23C shows a flow chart of operation B in FIG. 23B.

In the integration process, conflicting surface nodes are deleted and matching surface nodes are integrated to obtain a more reliable integrated surface node. A process of surface node integration is shown in FIGS. 23A-23C. In FIG. 23A, Q represents the number of surface node group generated by all camera groups and Ji represents groups sorted in the order of the number of surface nodes. The integration process is implemented on surface node groups $J_0$ through $J_{Q-1}$ sequentially.

[Flow of Integration Process]

Let us consider an initial surface node $P_i$ of a surface node group $J_i$. Operation A (integration process regarding $P_i$ and surface nodes $P_j \in S_i$ connected to $P_i$) is implemented on the surface node of interest. In the operation A, operation B (determination whether $P_i^b$ is maintained or cancelled) is implemented on the surface node $P_i$ of interest. If $P_i^b$ should be maintained according to the result of operation B, the operation A is implemented on surface nodes connected to $P_i$ sequentially. If $P_i$ should be cancelled, the operation A will not be implemented on the surface nodes connected to $P_i$. As foregoing, rightness of a surface node greatly depends on rightness of a surface node to which the former is connected. Hereinafter, operation A and operation B will be discussed in detail.

[Operation A (Integration Process Regarding $P_i$ and Surface Nodes $P_j \in S_i$ Connected to $P_i$)]

As foregoing, the process is initiated with an initial surface node of a surface node group.

(1) Step 1: Operation B is implemented on a surface node $P_i$ of interest (2) Step 2: According to the result of operation B, if $P_i$ is maintained, proceed to step 3. If $P_i$ is cancelled, complete the operation.

(3) Step 3: Operation A is implemented on all surface nodes $P_j \in S_i$ connected to $P_i$

[Operation B (Examine Whether $P_i^b$ is Maintained or Cancelled]

A surface node corresponding to the surface node $P_j^b$ is searched from other camera groups. This operation comprises three steps: rightward search, leftward search and removal of conflicted surface node. The steps will be explained hereinafter respectively.

[Rightward Search]

Figure 24:
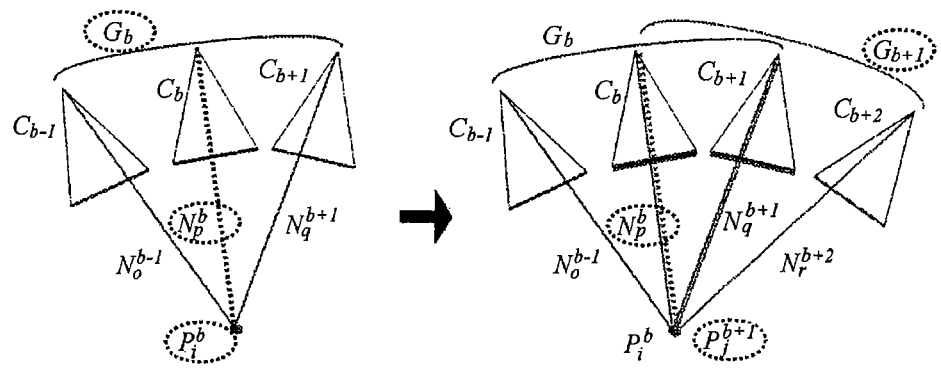
FIG. 24 shows searching of accordant or conflicted surface node from adjacent camera.

The corresponding surface node is searched from surface nodes of a right-side camera group. The rightward search regarding surface node $P_i^b$ is implemented as follows:

(1) Step 1: Initialization: k=b. Note on $P_i^b$ (2) Step 2: Search from a right-hand camera group A surface node of interest is expressed as $P_i^k(N_p^k, *, *)$, where * relates to any letter, and $P_i^k(N_p^k, *, *)$ indicates that an image node $N_p^k$ is used as an element in the surface node $P_i^k$. Matching surface nodes regarding $P_i^k(N_p^k, *, *)$ is searched from the surface nodes in a camera group $G_{k+1}$. A searching method is shown in FIG. 24. Here, regarding an element $N_p^k$ of $P_i^k$, surface nodes utilizing $N_p^k$ is searched from surface nodes $P^{k+1}$ in $G^{k+1}$. If a surface node $P_*^{k+1}(*, *, N_p^k)$ utilizing $N_p^k$ exists, the following conditions are tested.

Distance between $P_*^{k+1}$ and $P_i^k$ is less than a threshold $d_{integ}$.

No conflict exist between elements of $P_*^{k+1}$ and $P_i^k$. Conflict of elements means that the elements use different image nodes of the same camera image.

If these conditions are satisfied, it is determined that $P_i^k$ ($N_p^k, *, *$) and $P_*^{k+1}(*, *, N_p^k)$ are matched and the two surface nodes are integrated. Here, integration means that if there are any elements of $P_*^{k+1}(*, *, N_p^k)$ which do not exist in elements of $P_i^k$, such element is added to elements of $P_i^k$, the position of $P_i^k$ is then recomputed. After integration, let a surface node $P_*^{k+1}(*, N_p^k, *)$, k=k+1 be a surface node of interest, then step (2) is repeated.

If these conditions are not satisfied, it is determined that $P_i^k$ and $P_*^{k+1}$ are conflicted. The conflicting surface nodes are stored for using in cancellation process of conflicting surface nodes after searching operation. If $P_*^{k+1}(*, *, N_p^k)$ does not exist or conflicts with $P_i^k$, proceed to step 3.

(3) Step 3: Search from a camera group that next to the right-hand camera group

Figure 25:
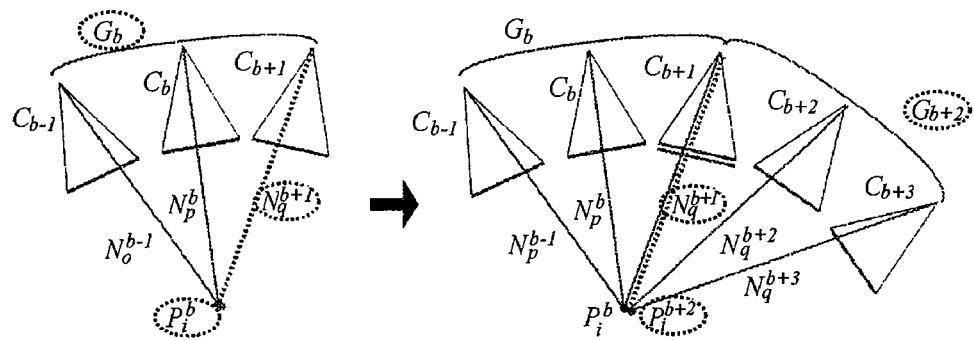
FIG. 25 shows searching of accordant or conflicted surface node from a camera next to the immediate adjacent camera.

A surface node of interest is expressed as $P_i^k(*, N_q^{k+1}, *)$. Matching surface nodes regarding $P_i^k(*, N_p^{k+1}, *)$ is searched from the surface nodes in a camera group $G_{k+2}$. A searching method is shown in FIG. 25. Here, regarding an element $N_q^{k+1}$ of $P_i^k$, surface nodes $P_*^{k+2}(*, *, N_q^{k+2})$ utilizing $N_q^{k+1}$ is searched from surface nodes $P^{k+2}$. If a surface node $P_*^{k+2}$ is found, conditions used in step (2) are tested. If matched, integrate $P_i^k$ and $P_*^{k+2}$ and let a surface node of interest $P_*^{k+2}$ (*, *, $N_q^{k+1}$), k=k+2, and return to the step.

If $P_*^{k+2}(*, *, N_q^{k+1})$ does not exist or conflicts with $P_i^k$, complete the rightward searching operation. According to the above operation, surface node integration is conducted on camera group in the rightward direction successively as long as matching surface nodes can be found.

[Leftward Search]

Search matching surface nodes successively from camera groups in the left-hand direction. Searching is performed in the similar manner as in the rightward search. Descriptions of the rightward search can be incorporated by replacing k+1, k+2 with k−1, k−2.

[Cancellation of Conflicting Surface Nodes]

When searching of surface nodes for integration in the rightward and leftward is completed, cancellation operation of conflicted surface nodes found during the searching process is performed. According to the cancellation operation, comparing a conflicted surface node with $P_i^b$, one with a larger number of node vectors being used is made to remain, and the other with a smaller number of node vectors is eliminated. If the operation B is not conducted for one surface node, the cancellation operation is performed after the operation B is conducted on the surface node.

According to the above operation, surface nodes indicating the same mesh mode is integrated and if there exists a conflict between surface nodes, either one of them is deleted by majority. According to the three-dimensional reconstruction of the present system, it is possible to obtain highly reliable data by redundant error prevention operation including generation of surface nodes using connectivity information of nodes and different kinds of thresholds and cancellation of conflicted points by majority.

Figure 26:
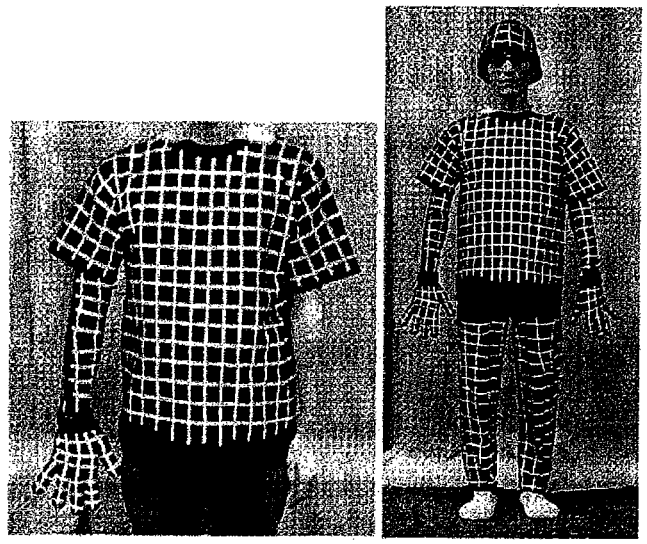
FIG. 26 shows a subject wearing clothing with a mesh marker.
Figure 27:
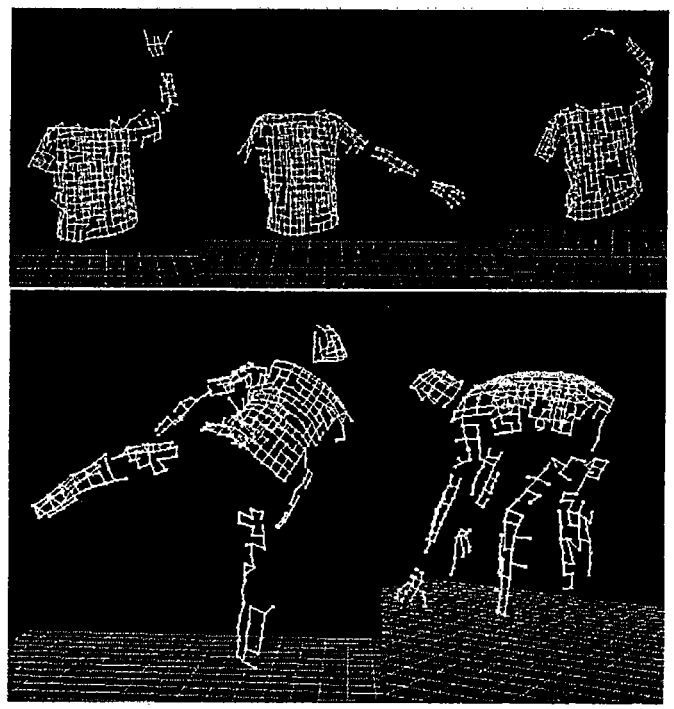
FIG. 27 shows an experiment of real-time 3D reconstruction where an upper view corresponds to a left view of FIG. 26 and a lower view corresponds to a right view of FIG. 26.

Lastly, a motion capture experimentation regarding a person having a mesh marker on his whole body is shown. Real-time 3D reconstruction was carried out regarding the mesh marker shown in FIG. 26. In FIG. 27, an upper view corresponds to the mesh marker in the left view in FIG. 26 and a lower view corresponds to the mesh marker in the right view in FIG. 26. It is confirmed that real-time 3D reconstruction was performed with respect to a large number of nodes. It is confirmed that 3D reconstruction was performed with respect to detailed portions such as fingers as well as to the whole body.

The invention is capable of using in the fields of robotics, biomechanics, sports science, medical, and computer animation.

The invention claimed is:

1. A motion capture system comprising:
    a mesh marker comprising a plurality of intersecting lines, wherein intersections of the lines of the mesh marker are defined as nodes for providing position information of feature points and the lines connecting each node are defined as edges for providing connectivity information of connection between the feature points and wherein images of the lines and the intersections are obtained by photographing the mesh marker;
    a plurality of cameras for photographing a subject with said mesh marker to obtain 2D images of the mesh marker;
    a node/edge detecting section for detecting node/edge information of said mesh marker from said 2D images obtained by each camera, the nodes in the 2D images defined as image nodes, the node/edge information comprising position information of the image nodes and connectivity information between the image nodes; and
    a 3D reconstructing section for reconstructing 3D information of nodes by using the node/edge information which is detected from said 2D images obtained by different cameras,
    wherein each of the image nodes in the image obtained by the camera is expressed as a straight line drawn from the position of each camera in the 3D space, the straight line is defined as a node vector, the nodes in the 3D space are defined as surface nodes, and a position of each surface node is reconstructable by obtaining an intersection of node vectors with respect to the positions of different cameras, and
    wherein said 3D reconstruction section uses the connectivity information of image nodes to select a set of intersecting node vectors.

2. The system of claim 1, wherein said plurality of cameras are comprised of a plurality of camera groups and wherein said 3D information of nodes are obtained by each camera group.

3. The system of claim 2, wherein said each camera group is comprised of a series of neighboring cameras.

4. The system of claim 2, wherein each neighboring camera group has at least one common camera.

5. The system of claim 1, wherein said node/edge detecting section comprises:

a sharpening/binarizing section for obtaining binary images by binarizing sharpened images which are obtained from original images by sharpening;
a thinning section for thinning said binary images to obtain thinned images; and
a node position/connectivity information extraction section for detecting nodes as intersections of lines of said thinned images and edges as connections of intersections.

6. The system of claim 1, wherein said 3D reconstructing section reduces the number of image nodes for candidates when searching image nodes whose node vectors intersect one another by using the connectivity information of image nodes that have been three-dimensionally reconstructed.

7. A motion capture system comprising:
    a mesh marker wherein intersections of lines of the mesh marker are defined as nodes for providing position information of feature points and lines connecting each node are defined as edges for providing connectivity information of connection between the feature points;
    a plurality of cameras for photographing a subject with said mesh marker to obtain 2D images of the mesh marker;
    a node/edge detecting section for detecting node/edge information of said mesh marker from said 2D images obtained by each camera; and
    a 3D reconstructing section for reconstructing 3D information of nodes by using the node/edge information which is detected from said 2D images obtained by different cameras,
    wherein said 3D reconstructing section is configured to:
        determine an intersection of a plurality of node vectors of said plurality of cameras by a first strict intersection condition and a second less strict intersection condition;
        generate an initial surface node to obtain initial surface nodes as intersections which are selected according to said first intersection condition; and
        generate a surface node group to obtain surface nodes as intersections which are selected according to said second intersection condition from node vectors corresponding to image nodes connected to image nodes of said initial surface nodes via edges.

8. The system of claim 7, wherein said 3D reconstructing section is configured to obtain surface nodes as intersections which are selected according to said second intersection condition from node vectors corresponding to image nodes connected to image nodes of the generated surface nodes via edges.

9. The system of claim 7, wherein said first and second intersection conditions comprise a threshold for determining a distance between node vectors, and wherein a threshold for the first intersection condition is set smaller than a threshold for the second intersection condition.

10. The system of claim 7, wherein said first intersection condition comprises intersection determination as to whether a set or sets of node vectors corresponding to image nodes connected to the image nodes of the initial surface nodes via edges intersect one another.

11. The system of claim 7, wherein said first and second intersection conditions comprise the number of intersecting lines.

12. A motion capture system comprising:
    a mesh marker wherein intersections of lines of the mesh marker are defined as nodes for providing position information of feature points and lines connecting each node are defined as edges for providing connectivity information of connection between the feature points;

a plurality of cameras for photographing a subject with said mesh marker to obtain 2D images of the mesh marker;

a node/edge detecting section for detecting node/edge information of said mesh marker from said 2D images obtained by each camera; and a 3D reconstructing section for reconstructing 3D information of nodes by using the node/edge information which is detected from said 2D images obtained by different cameras, wherein said 3D reconstructing section is configured to:

generate an initial surface node to obtain initial surface nodes as intersections by searching a combination of node vectors intersecting one another with a distance below a predetermined threshold from a plurality of node vectors of said plurality of cameras; and generate a surface node group to obtain the surface nodes as intersections by searching a combination of node vectors intersecting one another with a distance below a predetermined threshold from node vectors corresponding to image nodes connected to image nodes of said initial surface nodes via edges.

13. The system of claim 12, said 3D reconstructing section is further configured to determine as to whether a set or sets of node vectors corresponding to image nodes connected to image nodes of the initial surface nodes via edges intersect one another; and if the node vectors intersect each other with a distance below a predetermined threshold, said combination of node vectors for the initial surface node is a correct combination and said intersections are taken as the initial surface nodes.

14. The system of claim 12, wherein said 3D reconstructing section is further configured to search a combination of node vectors intersecting one another with a distance below a predetermined threshold from node vectors corresponding to image nodes connected to image nodes of the generated surface nodes via edges and intersections thereof are taken as the surface nodes.

15. The system of claim 12, wherein said threshold used for generating an initial surface node is set smaller than said threshold used for generating a surface node group.

16. The system of claim 12, said 3D reconstructing section is further configured to generate a sub-surface node which is performed when expansion of surface node group by generating a surface node group is no longer possible;

wherein said 3D reconstructing section is configured to search a combination of node vectors intersecting each other with a distance below a predetermined threshold from node vectors corresponding to image nodes connected to image nodes of the generated surface nodes by edges and to determine intersections thereof as sub-surface nodes; and wherein said combination comprises node vectors whose number is less than the number for generating the surface nodes.

17. The system of claim 16, wherein said threshold used for generating a sub-surface node is set greater than said threshold used for generating an initial surface node.

18. The system of claim 12, wherein said surface node is defined as an intersection where at least three nodes are intersected.

19. The system of claim 1, wherein said plurality of cameras are comprised of a plurality of camera groups, and adjacent camera groups have at least one common camera and wherein said 3D reconstructing section comprises a local 3D reconstructing section for obtaining surface nodes for each camera group; and a surface node integration section for integrating surface nodes obtained by each local 3D reconstructing section.

20. The system of claim 19, wherein said surface node integrating section integrates matched surface nodes between each camera group and cancels conflicted surface nodes.

21. The system of claim 20, wherein determination as to whether the surface nodes match or conflict includes two conditions comprising whether a distance between two surface nodes is below a predetermined threshold and whether different image nodes in the same camera image are not used.

22. The system of claim 20, wherein the integration of surface nodes comprises integrating image nodes of matched surface nodes; and renewing positions of surface nodes with the integrated image nodes.

23. The system of claim 20, wherein if two surface nodes conflict, one surface node utilizing a more number of node vectors remains and the other surface node utilizing a fewer number of node vectors is canceled.

24. The system of claim 19, wherein the integration of surface nodes is initiated from the initial surface nodes.

25. A method of 3D reconstructing feature points in an optical motion capturing using a mesh marker wherein intersections of lines of the mesh marker are defined as nodes for providing position information of feature points and lines connecting two nodes are defined as edges for providing connectivity information of connection between the feature points, said method comprising:

obtaining 2D images of the mesh marker by photographing a subject with said mesh maker with a plurality of cameras, the mesh marker comprising a plurality of intersecting lines;

detecting node/edge information of said mesh marker from said 2D images obtained by each camera, the nodes in the 2D images defined as image nodes, and the node/edge information comprising position information of the image nodes and connectivity information between the image nodes; and reconstructing 3D information of nodes by using the node/edge information which is detected from said 2D images obtained by different cameras, wherein:

images of the lines and the intersections are obtained by photographing the mesh marker, each of the image nodes in the image obtained by the camera is expressed as a straight line drawn from the position of each camera in the 3D space, the straight line is defined as a node vector, the nodes in the 3D space are defined as surface nodes, and a position of each surface node is reconstructable by obtaining an intersection of node vectors with respect to the positions of different cameras, and said 3D reconstruction section uses the connectivity information of image nodes to select a set of intersecting node vectors.

* * * * *